(12) United States Patent
Hori

(10) Patent No.: US 9,779,369 B2
(45) Date of Patent: Oct. 3, 2017

(54) PROCESS FLOW DEFINITION CREATING SYSTEM, PROCESS FLOW DEFINITION CREATING DEVICE, AND A METHOD OF CREATING PROCESS FLOW DEFINITION

(71) Applicant: Seijiro Hori, Tokyo (JP)

(72) Inventor: Seijiro Hori, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 822 days.

(21) Appl. No.: 14/205,584

(22) Filed: Mar. 12, 2014

(65) Prior Publication Data

US 2014/0280445 A1    Sep. 18, 2014

(30) Foreign Application Priority Data

Mar. 15, 2013 (JP) ................... 2013-054326

(51) Int. Cl.
G06F 15/16 (2006.01)
G06Q 10/06 (2012.01)
H04L 29/08 (2006.01)
G06Q 10/08 (2012.01)

(52) U.S. Cl.
CPC ............. *G06Q 10/06* (2013.01); *G06Q 10/08* (2013.01); *H04L 67/2819* (2013.01)

(58) Field of Classification Search
CPC ..... G06Q 10/06; G06Q 10/08; H04L 67/2819
USPC ................................ 709/201, 220
See application file for complete search history.

(56) References Cited

U.S. PATENT DOCUMENTS

| 7,886,296 B2* | 2/2011 | Ly ........................ G06F 9/5027 706/47 |
| 2002/0083121 A1* | 6/2002 | Chang ................. H04L 12/2805 709/201 |
| 2006/0064497 A1* | 3/2006 | Bejerano ............... H04W 48/20 709/228 |
| 2007/0214256 A1* | 9/2007 | Castaneda ............. H04L 67/025 709/224 |
| 2008/0184234 A1* | 7/2008 | Vutharkar ............. H04L 41/028 718/100 |

(Continued)

FOREIGN PATENT DOCUMENTS

| JP | 2009-140401 | 6/2009 |
| JP | 2011-035779 | 2/2011 |

OTHER PUBLICATIONS

Machine translation of JP 2009/140401 A.*
Machine translation of JP 2011/035779 A.*

*Primary Examiner* — Philip B Tran
(74) *Attorney, Agent, or Firm* — IPUSA, PLLC

(57) ABSTRACT

A process flow definition creating system provides a process flow definition to a system for executing processes in an order in accordance with the process flow definition. The process flow definition creating system includes a device list storage unit; a screen information storage unit, wherein the screen information is for displaying a first field and a second field; a display control unit that displays the parsed screen information; a setting reception unit that receives a setting for the first field and a setting for the second field, wherein the setting for the first field defines the processes and the order of the processes, and the setting for the second field defines correspondence between the processes and devices that are to execute the processes; and a definition creating unit that creates the process flow definition, based on the settings.

19 Claims, 25 Drawing Sheets

(56) References Cited

U.S. PATENT DOCUMENTS

| 2009/0027301 A1* | 1/2009 | Mosko | G01C 21/00 345/1.1 |
| 2011/0016214 A1* | 1/2011 | Jackson | G06F 9/5044 709/226 |
| 2011/0122779 A1* | 5/2011 | Meirosu | H04W 28/08 370/252 |

* cited by examiner

FIG.7A

| PROCESS | DEVICE | MACHINE ID |
|---|---|---|
| SCANNING | MFP | 001 |
| OCR | MFP<br>WORKFLOW PROCESSING SERVER | 001<br>002 |
| PDF CONVERSION | WORKFLOW PROCESSING SERVER | 002 |
| E-MAIL TRANSMISSION | WORKFLOW PROCESSING SERVER | 002 |

FIG.7B

| CONNECTION DESTINATION | IP ADDRESS | AUTHENTICATION INFORMATION |
|---|---|---|
| MFP | 1.1.1.1 | USER NAME, PASSWORD |
| WORKFLOW PROCESSING SERVER | 1.1.1.2 | ADMINISTRATOR NAME, PASSWORD |

FIG.8A

| WORKFLOW NAME | PROCESS 1 | PROCESS 2 | PROCESS 3 | PROCESS 4 | PROCESS 5 |
|---|---|---|---|---|---|
| WORKFLOW 1 | SCANNING | COMPRESSION | OCR | PDF CONVERSION | MAIL TRANSMISSION |
|  | MFP | MFP | WORKFLOW PROCESSING SERVER | MFP | MFP |
| WORKFLOW 2 | SCANNING | OCR | PDF CONVERSION | DOCUMENT BOX |  |
|  | MFP | WORKFLOW PROCESSING SERVER | MFP | WORKFLOW PROCESSING SERVER |  |
| WORKFLOW 3 | IMAGE DATA TRANSMISSION | OCR | PDF CONVERSION | DOCUMENT BOX | PRINTING |
|  | MFP | WORKFLOW PROCESSING SERVER | MFP | WORKFLOW PROCESSING SERVER | MFP |

FIG.8B

| WORKFLOW NAME | PROCESS 1 | PROCESS 2 | PROCESS 2-1 | PROCESS 3 | PROCESS 3-1 | PROCESS 4 | PROCESS 5 |
|---|---|---|---|---|---|---|---|
| WORKFLOW 1 | SCANNING | COMPRESSION | CONNECTION PROCESS | OCR | CONNECTION PROCESS | PDF CONVERSION | MAIL TRANSMISSION |
|  | MFP | MFP | MFP | WORKFLOW PROCESSING SERVER | WORKFLOW PROCESSING SERVER | MFP | MFP |

```xml
<?xml version='1.0' encoding='UTF-8' ?>
<flows>
  <flow>
    <plugin id="SCAN" type="input" displayName="SCANNING" proceed="machineID_001" />   ← PROCESS 1
      <parameter>
        <resolution>300</resolution>
        <concentrate>5</concentrate>
      </parameter>
    <plugin id="Compression" type="filter" displayName="COMPRESSION" proceed="machineID_001" />   ← PROCESS 2
    <plugin id="Connect" type="send" displayName="" proceed="machineID_001" />
      <parameter>
        <IPaddress>1.1.1.2</IPaddress>
      </parameter>                                                                     ← PROCESS 2-1
    <plugin id="OCR" type="filter" displayName="OCR" proceed="machineID_002" />        ← PROCESS 3
    <plugin id="Connect" type="send" displayName="" proceed="machineID_002" />
      <parameter>
        <IPaddress>1.1.1.1</IPaddress>
      </parameter>                                                                     ← PROCESS 3-1
    <plugin id="PDFConverter" type="filter" displayName=" PDF CONVERSION" proceed="machineID_001" />   ← PROCESS 4
    <plugin id="MailSend" type="output" displayName=" MAIL TRANSMISSION" proceed="machineID_001" />
      <parameter>
        <address>123@abc.com300</address>
      </parameter>                                                                     ← PROCESS 5
    <current_point>
      <plugin id="SCAN" />
    </current_point>
  </flow>
</flows>
```

FIG.9

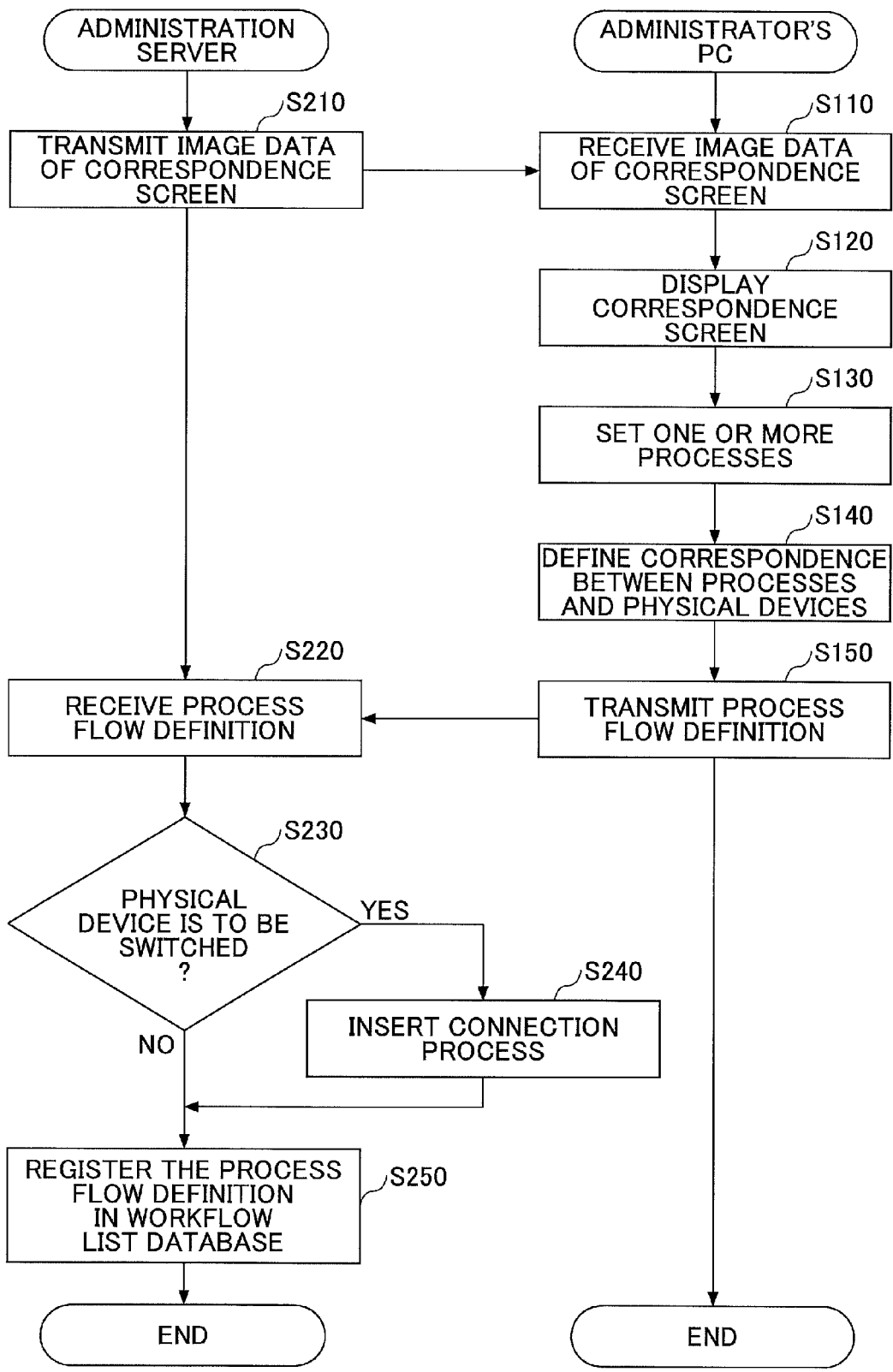

FIG.13A
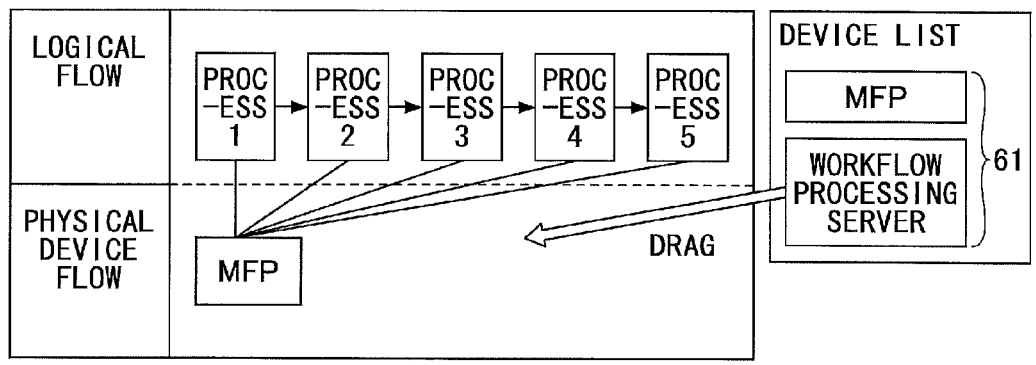
FIG.13B
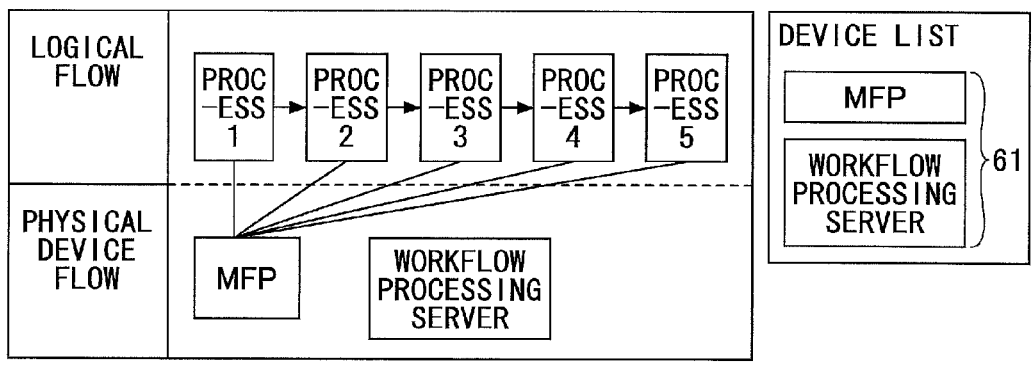
FIG.13C
CORRESPONDENCE OF SUBSEQUENT LOGICAL FLOW
● TO BE LINKED WITH MODIFICATION OF CORRESPONDENCE
○ NOT TO BE LINKED WITH MODIFICATION OF CORRESPONDENCE
○ QUERY AS TO WHETHER OR NOT TO MODIFY CORRESPONDENCE

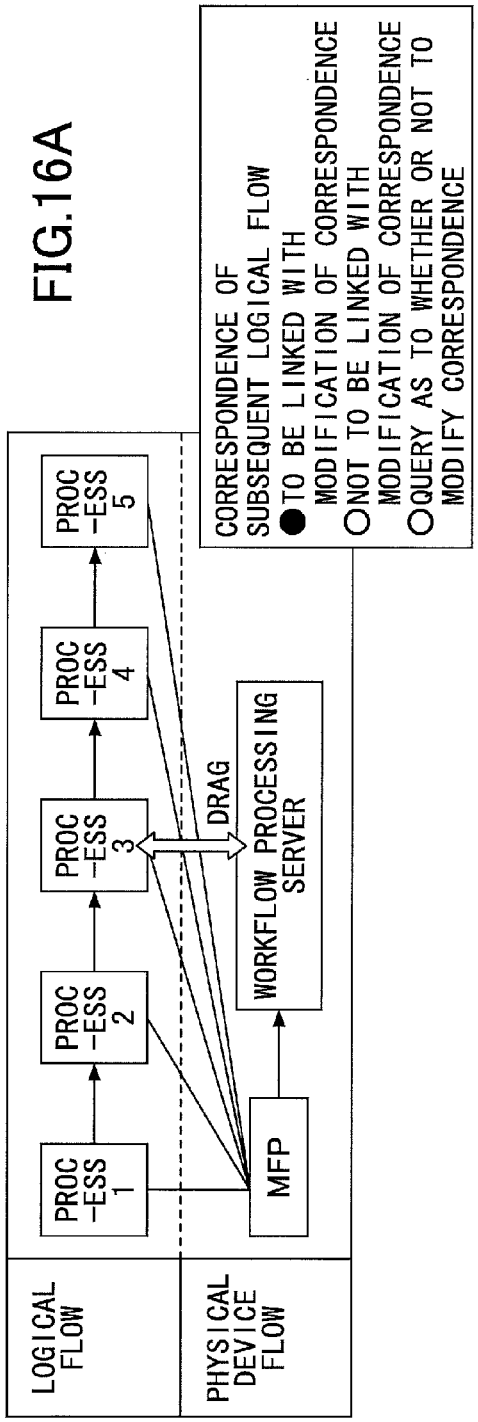

FIG.19A

```
PLEASE SELECT A WORKFLOW

[WORKFLOW 1]        [DETAIL]

[WORKFLOW 2]        [DETAIL]

[WORKFLOW 3]        [DETAIL]

```
PLEASE LOG IN

USER NAME  [_____]

PASSWORD   [_____]

| WORKFLOW NAME | PROCESS 1 | PROCESS 2 | PROCESS 2-1 | PROCESS 3 | PROCESS 3-1 | PROCESS 4 | PROCESS 5 |
|---|---|---|---|---|---|---|---|
| WORKFLOW 1 | SCANNING | COMPRESSION | CONNECTION PROCESS | OCR | CONNECTION PROCESS | PDF CONVERSION | MAIL TRANSMISSION |
| | MFP | MFP | MFP | CLOUD | CLOUD | MFP | MFP |

FIG.22B

| WORKFLOW NAME | PROCESS 1 | PROCESS 2 | PROCESS 2-1 | PROCESS 3 |
|---|---|---|---|---|
| PROCESS FLOW DEFINITION FOR POLLING | — | — | — | POLLING |
| | — | — | — | MFP |

PROCESS FLOW DEFINITION CREATING SYSTEM, PROCESS FLOW DEFINITION CREATING DEVICE, AND A METHOD OF CREATING PROCESS FLOW DEFINITION

BACKGROUND OF THE INVENTION

1. Field of the Invention

The present invention relates to a process flow definition creating system, a process flow definition creating device, and a method of creating a process flow definition. The process flow definition defines processes executed by corresponding devices, and an order of executing the processes.

2. Description of the Related Art

An information processing system has been known that executes a sequence of processes. In such an information processing system, an administrator or the like may define a sequence of processes as a workflow in advance. The sequence of processes may include a combination of a typical data input process, a typical data conversion process, and/or a typical data output process. When a user inputs a command to start execution of the sequence of processes defined in the workflow, the information processing system executes the processes in accordance with an order defined by the workflow. In order to execute the sequence of the processes, the user may select the predetermined workflow. The user may not be required to select and execute the processes individually. Thus, the sequence of the processes can be efficiently executed.

FIG. 25 is a diagram showing an example of processes included in a workflow. Here, the process 1 is a process of scanning an original document, the process 2 is a process of data compression, the process 3 is an optical character recognition (OCR) process, the process 4 is a PDF conversion process, and the process 5 is a mail sending process. In many cases, such a workflow is defined by an administrator of a user's account. The definition of the workflow may be made by combining such processes. The user may select a desired workflow from a plurality of workflows that is defined in advance by the administrator (cf. Patent Document 1 (Japanese Unexamined Patent Publication No. 2011-035779), for example). Patent Document 1 discloses an image forming device that displays names of defined workflows and processes included in the corresponding workflows. Here, each of the workflows corresponds to the processes included in the workflow.

SUMMARY OF THE INVENTION

According to an aspect of the present invention, there is provided a process flow definition creating system configured to provide a process flow definition to a system for executing processes in an order in accordance with the process flow definition for defining the processes to be executed by corresponding devices and the order of executing the processes. The process flow definition creating system includes a device list storage unit configured store a list of the devices; a screen information storage unit configured to store screen information, wherein the screen information is for displaying a first field and a second field, the first field is for setting the processes in the order, and the second field is for setting the devices that are to execute the corresponding processes; a display control unit configured to parse the screen information, and configured to display the parsed screen information; a setting reception unit configured to receive a setting for the first field and a setting for the second field, wherein the setting for the first field defines the processes and the order of the processes, and the setting for the second field defines correspondence between the processes and the devices that are to execute the processes; a definition creating unit configured to create the process flow definition, based on the order of the processes and the devices corresponding to the processes that are received by the setting reception unit; and a definition storage unit configured to store the process flow definition.

According to another aspect of the present invention, there is provided a process flow definition creating device including a device list storage unit configured store a list of devices; a screen information storage unit configured to store screen information, wherein the screen information is for displaying a first field and a second field, the first field is for setting processes in an order, and the second field is for setting the devices that are to execute the corresponding processes; a display control unit configured to parse the screen information, and configured to display the parsed screen information; a setting reception unit configured to receive a setting for the first field and a setting for the second field, wherein the setting for the first field defines the processes and the order of the processes, and the setting for the second field defines correspondence between the processes and the devices that are to execute the processes; a definition creating unit configured to create a process flow definition, based on the order of the processes and the devices corresponding to the processes that are received by the setting reception unit; a definition storage unit configured to store the process flow definition; and a network communication unit configured to transmit the process flow definition to a system for executing the processes in the order in accordance with the process flow definition.

According to another aspect of the present invention, there is provided a method of creating a process flow definition, wherein the process flow definition is to be provided to a system for executing processes in an order in accordance with the process flow definition, and the process flow definition defines the processes to be executed by corresponding devices and the order of executing the processes. The method includes storing a list of the devices; storing screen information, wherein the screen information is for displaying a first field and a second field, the first field is for setting the processes in the order, and the second field is for setting the devices that are to execute the corresponding processes; parsing the screen information, and displaying the parsed screen information; receiving a setting for the first field and a setting for the second field, wherein the setting for the first field defines the processes and the order of the processes, and the setting for the second field defines correspondence between the processes and the devices that are to execute the processes; creating the process flow definition, based on the order of the processes and the devices corresponding to the processes that are received by the receiving; and storing the process flow definition.

Other objects, features and advantages of the present invention will become more apparent from the following detailed description when read in conjunction with the accompanying drawings.

BRIEF DESCRIPTION OF THE DRAWINGS

FIG. 7A is a diagram showing an example of a device list table;

FIG. 7B is a diagram showing an example of a connection list database;

FIGS. 8A and 8B are diagrams showing examples of a process flow definition;

FIG. 9 is a diagram showing an example of the process flow definition in an XML format;

FIG. 11 is a flowchart showing an example of a procedure of the administrator's PC and the administration server for creating a process flow definition;

FIGS. 13A-13C are diagrams illustrating an example of modifying correspondence;

FIGS. 16A and 16B are diagrams showing an example of the correspondence screen for a case where the administrator selects "query as to whether or not to modify the correspondence;"

FIGS. 19A and 19B are diagrams showing examples of screens for selecting the workflow;

FIGS. 22A and 22B are diagrams illustrating an example of a process flow definition for polling;

DETAILED DESCRIPTION OF THE PREFERRED EMBODIMENTS

A workflow can be executed, at least, by a single device. For example, all the processes included in a workflow may be executed by a single multifunction peripheral (MFP). However, in order to allow a workflow to be executed by a single device, a process that cannot be processed by the single device may not be included in a workflow. However, some users may wish to define a workflow by combining various types of processes.

Accordingly, a plurality of processes included in a workflow may be executed by a plurality of devices. When the plurality of processes included in the workflow is executed by the plurality of devices, an administrator of the workflow may be required to do some work for associating the processes with the devices. Such work can be facilitated, and operability for such work can be improved.

There is a need for a processing flow definition information creating system that can provide a graphical user interface (GUI) with which a workflow can be flexibly defined.

According to an embodiment of the present invention, a process flow definition creating system can be provided that may facilitate defining a workflow.

Hereinafter, the embodiment of the present invention is explained by referring to the accompanying drawings. However, a technical scope of the present invention is not limited to the embodiment.

Figure 1:
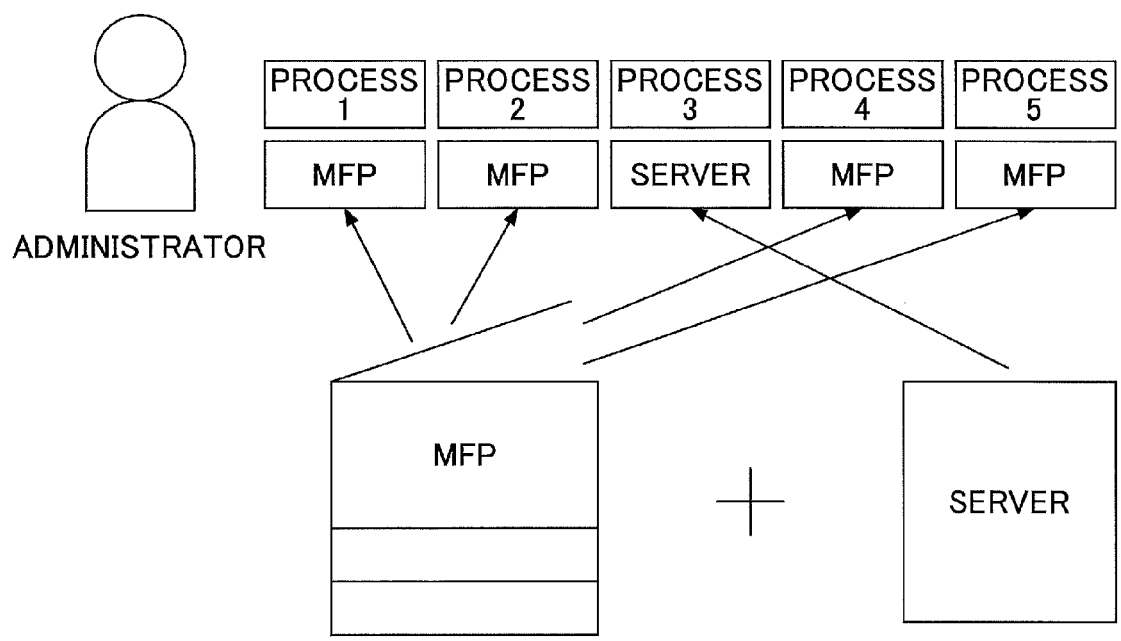
FIG. 1 is a diagram showing an example of correspondence between processes and devices.

FIG. 1 is a diagram showing an example of correspondence between processes and devices. For example, the processes 1, 2, 4, and 5 correspond to a multifunction peripheral (MFP), and the process 3 corresponds to a server. An administrator of workflow may define the correspondence between the processes and the devices by using a graphical user interface (GUI).

Figure 2A:
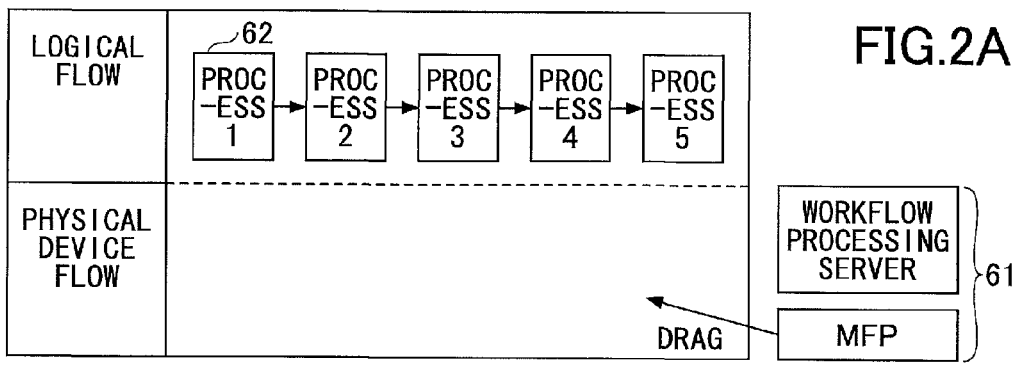
FIGS. 2A-2D are diagrams schematically illustrating a procedure of an administrator for defining a workflow.

FIGS. 2A-2D are diagrams schematically illustrating a procedure of the administrator for defining a workflow by using an information processing system according to the embodiment. In FIG. 2A, selection of the processes 1 to 5 have already been made. Thus, the processes 1 to 5 are included in a single workflow. For each of FIGS. 2A-2D, the upper field of the figure may be referred to as "logical flow field" (or a first field), and the lower field of the figure may be referred to as "physical device flow field" (or a second field). The administrator may perform an operation for defining correspondence between the devices (which are to execute the processes 1 to 5) and the processes 1 to 5. Hereinafter, the screen shown in each of FIGS. 2A-2D may be referred to as a correspondence screen. It is assumed that the correspondence screen is displayed on an administrator's personal computer (PC) 150.

FIG. 2A: A device list is displayed on the correspondence screen. The device list may include an icon and/or a name of a physical device that can execute one or more of the processes 1 to 5. A user may drag and drop a device icon 61 of a desired physical device to the physical device flow field by operating a pointing device, such as a mouse or a touch panel. At this time, the administrator's PC 150 may automatically display device icons 61 of physical devices that can execute the processes 1 to 5 in the physical device flow field.

Figure 2B:
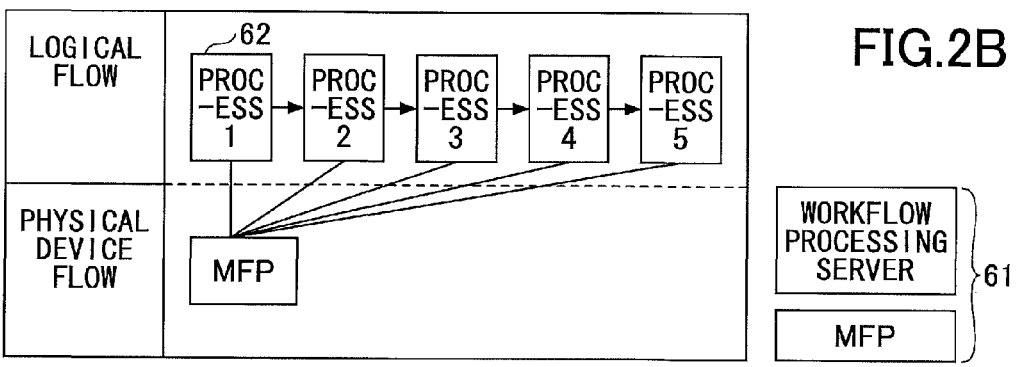

FIG. 2B: The administrator's PC 150 may connect each of process icons 62 of the corresponding processes 1 to 5 and the device icon 61 by a line. The administrator can visually understand the correspondence between the processes 1 to 5 and the physical device, by confirming the lines that connect the physical device and the corresponding processes 1 to 5.

Figure 2C:
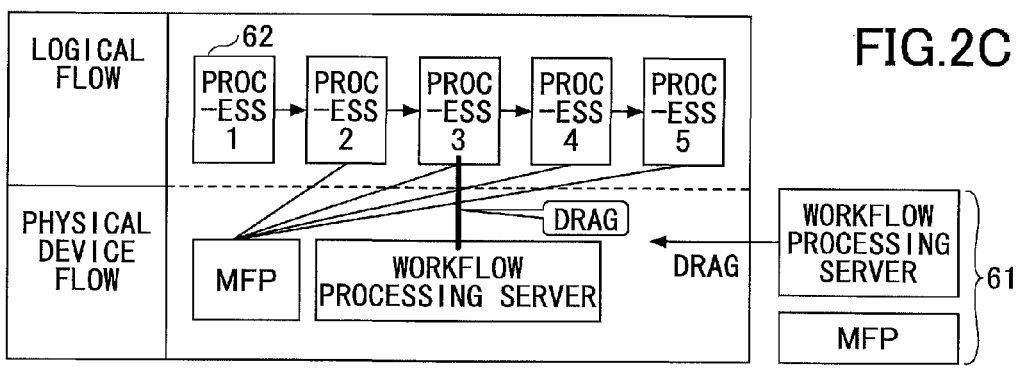

FIG. 2C: The administrator may wish to modify the correspondence. For example, for defining correspondence between the process 3 and a workflow processing server 100, the administrator may drag and drop a device icon 61 of the workflow processing server in the physical device flow field. Then, the administrator may drag from the process icon 62 of the process 3 to the device icon 61 of the workflow processing server 100 by using the pointing device. In this manner, the correspondence between the process 3 and the MFP 201 can be switched to the correspondence between the process 3 and the workflow processing server 100.

Figure 2D:
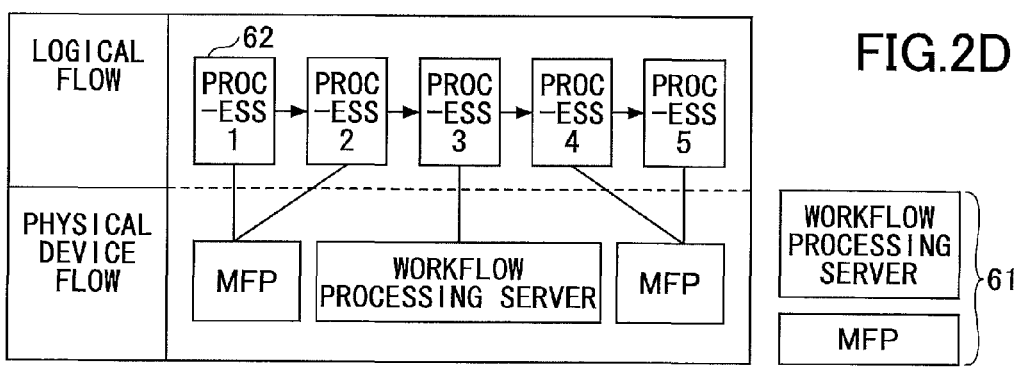

FIG. 2D: The administrator's PC 150 may connect the process icon 62 of the process 3 and the device icon 61 of the workflow processing server 100 by a line. The administrator can visually understand that the process 3 corresponds to the workflow processing server 100 by confirming the line that connects the process icon 62 of the process 3 and the device icon 61 of the workflow processing server 100. The correspondence between the MFP 201 and the processes 4 and 5 may be left as it is. Alternatively, the correspondence between the MFP 201 and the processes 4 and 5 (i.e., the processes downstream of the process 3) may be automatically switched to the correspondence between the workflow processing server 100 and the processes 4 and 5. Details are described below.

In this manner, the information processing system 500 according to the embodiment can create a logical flow and a physical device flow on the same screen. Accordingly, an administrator can visually define correspondence between a process and a physical device. Additionally or alternatively, the information processing system 500 can automatically define correspondence between a process and a physical device. Thus, an amount of operations to be performed by an administrator can be reduced. Additionally, after correspondence between a process and a physical device is automatically defined, the correspondence may be easily modified.

Hereinafter, a person who defines a process flow definition is referred to as "administrator." A person who executes a workflow is referred to as "user."

Here, a "process flow definition" is information that defines a workflow. The process flow definition may include at least the following information: (i) an order of processes (e.g., the processes 1 to 5 of FIGS. 2A-2D); (ii) devices that execute the processes; and (iii) job settings that may be required for the corresponding processes. A job setting may include, for example, a resolution and/or concentration of scanning, and an e-mail address. A job setting may be defined by an administrator, or by a user who executes a workflow.

Configuration Example

Figure 3A:
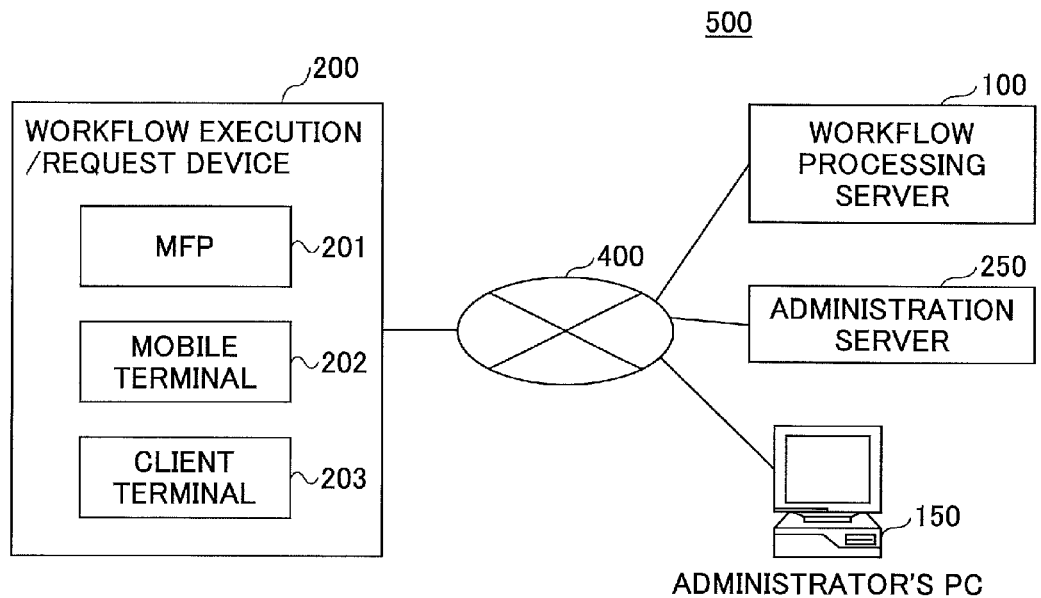
FIGS. 3A and 3B are system configuration diagrams of examples of an information processing system.

FIG. 3A is a diagram showing an example of a system configuration of the information processing system 500. A workflow execution/request device 200, the workflow processing server 100, and an administration server 250 are mutually connected through a network 400. Additionally, the administrator's personal computer (PC) 150 can be connected to the network 400.

The network 400 may be a local area network (LAN). Alternatively, the network 400 may be a wide area network (WAN) in which a plurality of LANs is connected through corresponding routers. The Internet may be considered as an example of the network 400, provided that a firewall may not be required. The network 400 may achieved by a wired line. Alternatively, a portion of or all the network 400 may be achieved by a wireless LAN (e.g., IEEE 802.11b/a/g/n). Additionally, a mobile communication network, such as a cellular phone network, a WiMAX-based network, or a PHS network, may be considered as an example of the network 400. Here, an ad-hoc network may also be considered as an example of the network 400. In the ad-hoc network, the devices included in the information processing system 500 are connected in a peer-to-peer manner by using an ad-hoc mode of the wireless LAN.

The workflow execution/request device 200 can execute a workflow by itself. The workflow execution/request device 200 can request the workflow processing server 100 to execute a workflow. In FIG. 3A, a MFP 201, a mobile terminal 202, and a client terminal 203 are depicted. An information processing device that includes a communication function, such as the MFP 201, the mobile terminal 202, or the client terminal 203, can be the workflow execution/request device 200. The information processing system 500 may include one or more workflow execution/request devices 200. The MFP 201 is a device that includes a function for forming an image, such as a copier, a scanner, a printer, or a facsimile machine. The MFP 201 may include at least one of the functions of the above-described devices (i.e., the copier, the scanner, the printer, and the facsimile machine). The MFP 201 may process image data as job data. Here, the image data may be created by scanning an original document, for example. The MFP 201 may transmit the processed job data to the workflow processing server 100, together with the process flow definition.

The mobile terminal 202 is a terminal that can be carried or held by a user, such as a mobile phone, a smart phone, a tablet terminal, a personal digital assistant (PDA), or a digital camera. The mobile terminal 202 may transmit, for example, image data, which may be job data that is captured by a camera of the mobile phone or the digital camera, and a process flow definition to the workflow processing server 100.

The client terminal 203 is an information processing device that can be used by a user, such as a laptop PC, a desktop PC, a work station, or a video conference terminal. The client terminal 203 may transmit application data created by an application and/or web data retrieved from a web server, as job data, to the workflow processing server 100, together with a process flow definition, for example.

Here, the workflow execution/request device 200 is assumed to be a device that is directly operated by a user. However, job data may not be created or stored by such a device that is directly operated by a user. For example, the client terminal 203 may specify job data stored in a network attached storage (NAS) or the like, and the client terminal 203 may cause the NAS or the like to transmit the job data to the workflow processing server 100.

The workflow processing server 100 is an information processing device, such as a PC, a server, or a thin client. The MFP 201 can be the workflow processing server 100. The workflow processing server 100 can execute one or more sequences of processes included in a workflow. The information processing system 500 may include one or more workflow processing servers 100. When the workflow processing server 100 receives job data and a process flow definition from the workflow execution/request device 200, the workflow processing server 100 may apply an OCR process to the job data, and the workflow processing server 100 may transmit an e-mail including the processed job data, in accordance with the process flow definition, for example.

The administration server 250 may receive a definition of a workflow from the administrator's PC 150. The administration server 250 may store one or more process flow definitions that are defined by an administrator. The administration server 250 may transmit a process flow definition in response to a request from the flow execution/request device 200. A user can select a workflow to be executed from a list of workflows.

As described above, an input process may be mainly executed by the workflow execution/request device 200. A conversion process may be mainly executed by a combination of the workflow execution/request device 200 and the workflow processing server 100. An output process may be mainly executed by the combination of the workflow execution/request device 200 and the workflow processing server 100.

The job data to be input may be based on a physical medium, such as an original document. Alternatively, the job data to be input may be based on electronic data, such as data created by a word processor. The output may be based on a physical medium, such as an image printed on a paper sheet. Alternatively, the output may be based on electronic data, such as electronic data stored in a document box, or electronic data included in an e-mail.

Figure 3B:
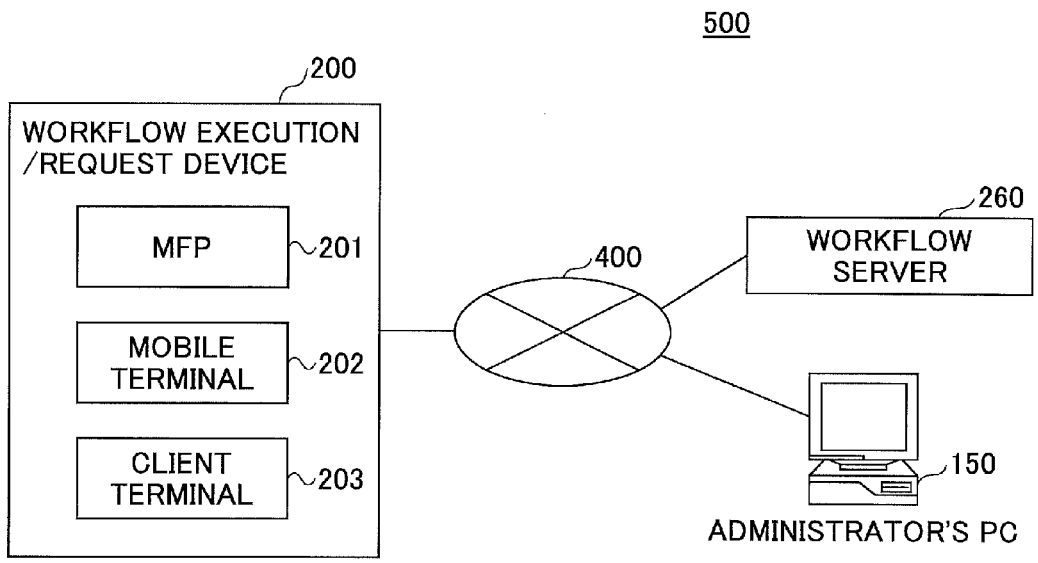

FIG. 3B is a diagram showing another example of the system configuration of the information processing system 500. As shown in FIG. 3B, the work flow execution/request device 200 and a workflow server 260 are connected through the network 400. The workflow server 260 includes the function of the workflow processing server 100 and the administration server 250 of FIG. 3A. Accordingly, the workflow server 260 can store process flow definitions. In addition, the workflow server 260 can execute a workflow. The system configuration of the information processing system 500 can be that of FIG. 3A or that of FIG. 3B. In the following, the embodiment is explained based on the system configuration shown in FIG. 3A.

Figure 4:
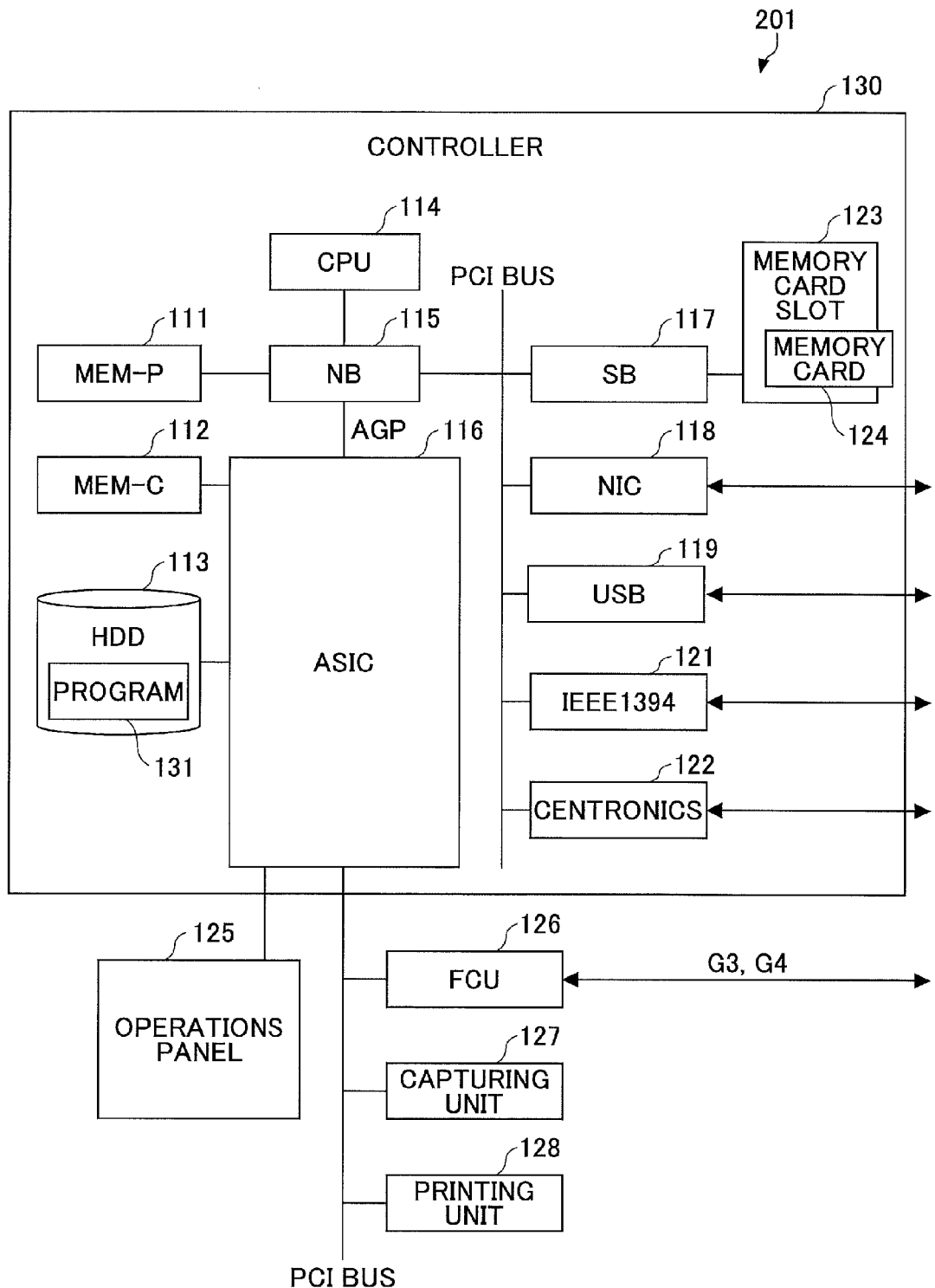
FIG. 4 is a diagram showing an example of a hardware configuration of a multifunction peripheral (MFP) as an example of a workflow execution/request device.

FIG. 4 is a diagram showing an example of a hardware configuration of the MFP 201 as an example of the workflow execution/request device 200. The MFP 201 may include a controller 130; an operations panel 125; a facsimile control unit (FCU) 126; a capturing unit 127; and a printing unit 128.

The controller 130 may include a CPU 114; an ASIC 116; a north bridge (NB) 115; a south bridge (SB) 117; a system memory (MEM-P) 111; a local memory (MEM-C) 112; a hard disk drive (HDD) 113; a memory card slot 123; a network interface controller 118; a USB device 119; an IEEE 1394 device 121; and a Centronics device 122.

The CPU 114 is an integrated circuit (IC) for executing various types of information processing. The CPU 114 can execute an application that runs on an operating system (OS) or on a platform. The CPU 114 can execute the application in a parallel manner on a process-by-process basis. The ASIC 116 is an IC for image processing. The NB 115 is a bridge for connecting the CPU 114 and the ASIC 116. The SB 117 is a bridge for connecting the NB 115 to a peripheral device or the like. The ASIC 116 and the NB 115 can be connected through an accelerated graphics port (AGP), for example.

The MEM-P 111 is a memory that is connected to the NB 115. The MEM-C 112 is a memory that is connected to the ASIC 116. The HDD 113 is a storage device that is connected to the ASIC 116. The HDD 113 can be used for storing, for example, image data, document data, programs, font data, and/or form data. The HDD 113 stores various types of application programs (e.g., programs of a copy application, a scanner application, a printer application, and a facsimile application) and a program 131. The program 131 is for receiving a definition of a workflow defined by a user.

The memory card slot 123 is connected to the SB 117. The memory card slot 123 is used for attaching (inserting) a memory card 124 to the MFP 201. The memory card 124 is a flash memory, such as a USB memory or a SD memory. The memory card 124 can be used for loading the program 131. Alternatively, the program 131 may be downloaded from a predetermined server to the MFP 201.

The NIC 118 is a controller for executing data communication through the network 400, for example. A MAC address may be used for the data communication. The USB device 119 is a device that provides a serial port conforming to the USB standard. The IEEE 1394 device 121 is a device that provides a serial port conforming to the IEEE 1394 standard. The Centronics device 122 is a device that provides a parallel port conforming to the Centronics specification. The NIC 118, the USB device 119, the IEEE 1394 device 121, and the Centronics device 122 are connected to the NB 115 and to the SB 117 through a peripheral component interconnect (PCI) bus.

The operations panel 125 is a hardware component (an operation unit) for a user to make an input to the MFP 201. At the same time, the operations panel 125 is a hardware component (a display) for the MFP 201 to display a menu screen. The operations panel 125 is connected to the ASIC 116. The FCU 126, the capturing unit 127, and the printing unit 128 are connected to the ASIC 116 through a peripheral component interconnect (PCI) bus.

The capturing unit 127 is for generating color digital data or monochrome digital data (which may be referred to as "image data," hereinafter). The capturing unit 127 optically scans an original document disposed on contact glass. The capturing unit 127 applies an analog-to-digital (A/D) conversion process to the reflected light. Then, the capturing unit 127 generates the image data by applying image processing to the resultant data.

The printing unit 128 may include a tandem type photosensitive drum, for example. The printing unit 128 can modulate a laser beam based on the above-described image data or based on page description language (PDL) data received from a user's PC. The printing unit 128 can form a latent image by scanning the modulated laser beam onto the photosensitive drum. The printing unit 128 can develop an image by applying toner onto the latent image. Here, the image is for one page. The printing unit 128 can transfer the image onto a paper sheet by using heat and pressure. Here, an electrophotographic plotter is explained as an example of the printing unit 128. However, the printing unit 128 is not limited to this example. For example, the printing unit 128 may be an inkjet plotter engine that forms an image by discharging liquid droplets.

The FCU 126 can establish connection to the network 400 through the NIC 118. In this case, the FCU 126 may communicate image data in accordance with a communication protocol conforming to T.37 standard or T.38 standard, for example. Alternatively, the FCU 126 can establish connection to a public telecommunication network. In this case, the FCU 126 may communicate image data in accordance with a communication protocol conforming to G3 standard or G4 standard, for example. Even if image data is received while a power supply of the MFP 201 is turned off, the FCU 126 can activate the printing unit 128, and the FCU 126 can cause the printing unit 128 to print the image data onto a paper sheet.

Figure 5:
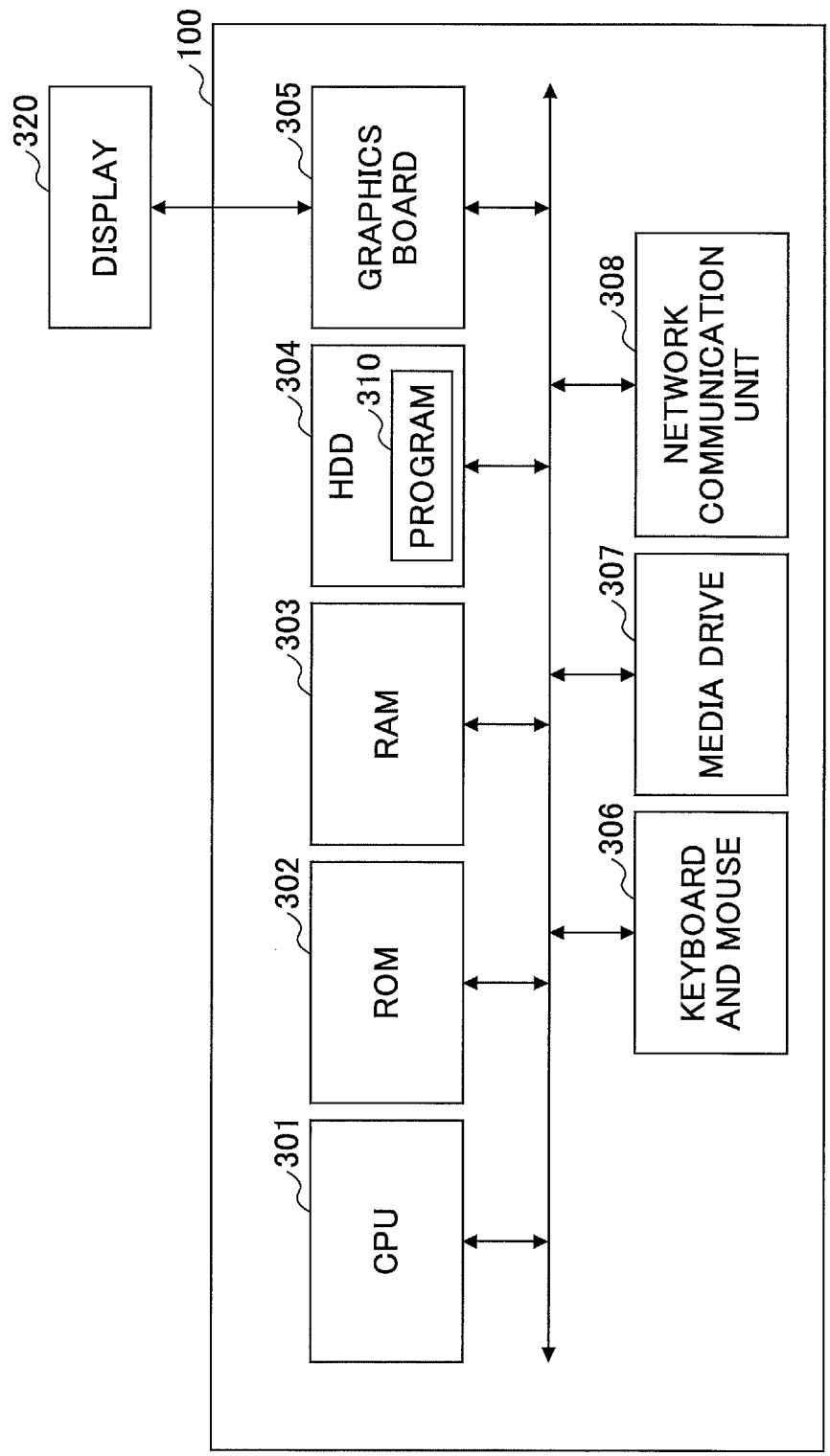
FIG. 5 is a diagram showing an example of a hardware configuration of a workflow processing server, an administration server, and an administrator's personal computer (PC)

FIG. 5 is a diagram showing an example of a hardware configuration of the workflow processing server 100, the administration server 250, and the administrator's PC 150. Each of the workflow processing server 100, the administration server 250, and the administrator's PC 150 may include a CPU 301; a ROM 302; a RAM 303, a HDD 304, a graphics board 305 to which a display 320 is connected; a keyboard and mouse 306; a media drive 307; and a network communication unit 308. The CPU 301 may load the program 310 stored in the HDD 304 into the RAM 303, and the CPU 301 may execute the program 310. In this manner, the CPU 301 can execute an input process, an output process, and/or data processing by controlling corresponding components. The ROM 302 may store the Basic Input/Output System (BIOS) and/or a starting program for reading out a bootstrap loader from the HDD 304 and writing the bootstrap loader in the RAM 303. The bootstrap loader reads out an operating system (OS) program from the HDD 304, and the bootstrap loader writes the operating system program in the RAM 303.

Here, the HDD 304 is used as a non-volatile memory. However, the non-volatile memory is not limited to the HDD 304. For example, a solid state drive (SSD) may be used, instead of the HDD 304. The HDD 304 stores the OS, a device driver, and the program 310. The program 310 is for providing a function described below. The display 320 displays a GUI screen. The GUI screen may be created by the graphics board 305 under control of a program.

The keyboard and mouse 306 is an input device for receiving a user's operation. The media drive 307 may read and write data in an optical medium, such as a compact disk, a DVD, or a Blu-ray Disc. Additionally, the media drive 307 may read and write data in a flash memory. The network communication unit 308 may be an Ethernet (registered trade mark) card for establishing connection to a LAN, for example. Protocol processing of the TCP/IP (and/or UDP/IP) and an application layer may be executed by the OS and/or by the program 310. There are many types of application layer protocols. For example, the Simple Network Management Protocol (SNMP), the HTTP, the FTP, the Server Message Block (SMB) can be considered as examples of the application layer protocol.

The program 310 may be stored in a computer readable recording medium as a file in an installable format or in an executable format. Accordingly, the program 310 may be distributed by distributing the computer readable recording medium storing the program 310. Alternatively or additionally, the program 310 may be distributed by a server (not shown) as a file in an installable format or in an executable format.

[Function, Table]

Figure 6:
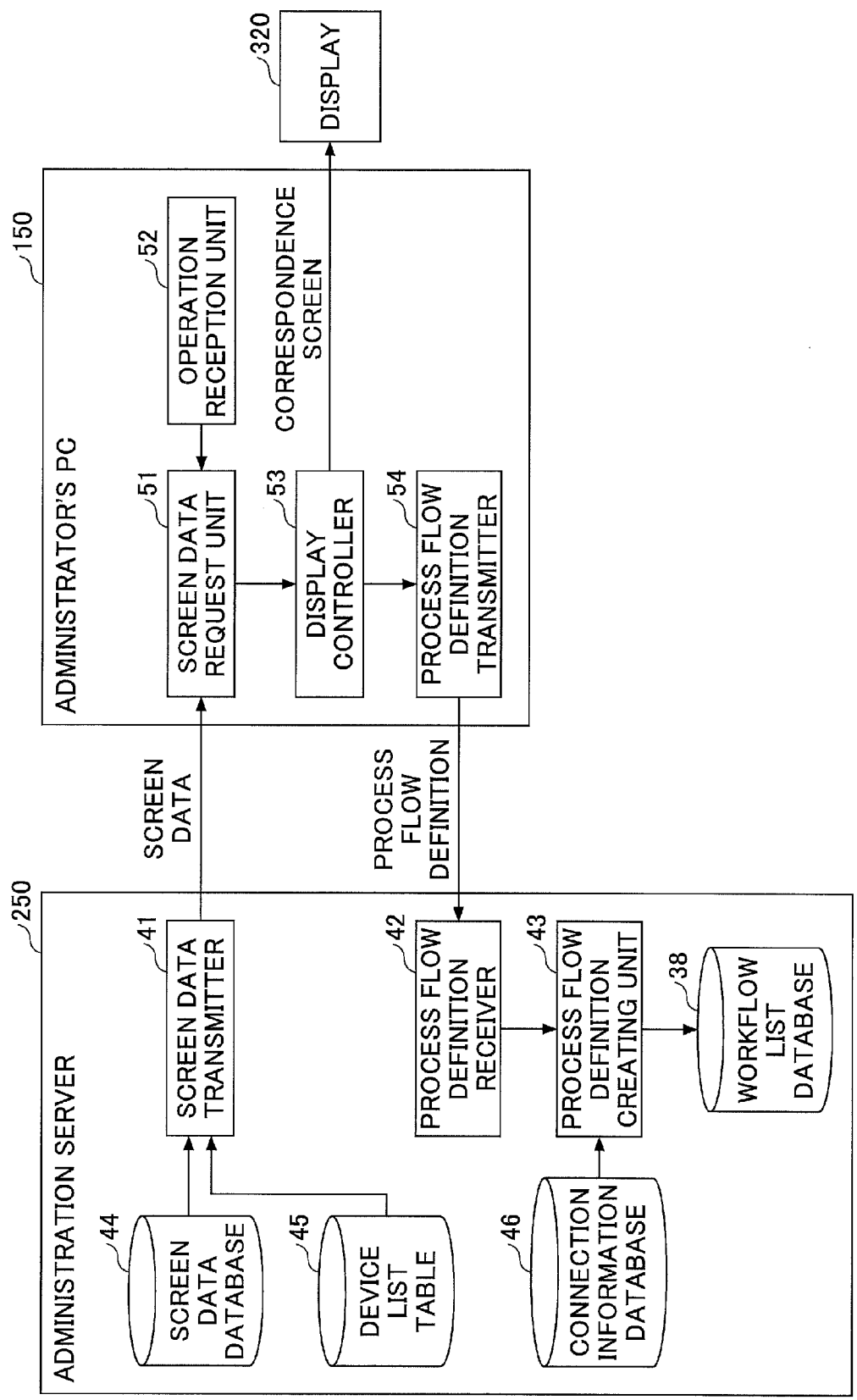
FIG. 6 is a diagram showing an example of functional blocks of the administration server and the administrator's PC.

FIG. 6 is a diagram showing an example of functional blocks of the administration server 250 and the administrator's PC 150. The administrator's PC 150 may include a screen data request unit 51; an operation reception unit 52; a display controller 53; and a process flow definition transmitter 54. The operation reception unit 52 receives a user's operation on the keyboard and mouse 306. The screen data request unit 51 requests to the administration server 250 for screen data. The display controller 53 may be a browser application, for example. The display controller 53 parses screen data, and the display controller 53 can displays the parsed screen data on the display 320. The screen displayed on the display 320 may be a correspondence screen. A process flow definition can be defined by receiving, through the operation reception unit 52, an administrator's operation on the correspondence screen displayed on the display 320. The process flow definition transmitter 54 transmits the process flow definition that is defined by the administrator to the administration server 250.

The administration server 250 may include a screen data database 44; a device list table 45; a workflow list database 38; a connection information database 46; a screen data transmitter 41; a process flow definition receiver 42; and a process flow definition creating unit 43. The screen data database 44 stores screen data described in HTML, JavaScript (registered trademark), and/or XML, for example. The device list table 45 registers a list of physical devices that can execute a process. The workflow list database 38 registers a list of workflows that are defined by an administrator. Here, a physical device is an element included in the information processing system 500 that can execute a workflow. Specifically, a physical device may be the workflow execution/request device 200 or the workflow processing server 100.

When the administration server 250 receives a request from the administrator's PC 150, the screen data transmitter 41 retrieves screen data from the screen data database 44, and the screen data transmitter 41 transmits the retrieved screen data to the administrator's PC 150. The process flow definition receiver 42 receives a process flow definition from the administrator's PC 150. The process flow definition receiver 42 outputs the received process flow definition to the process flow definition creating unit 43. The process flow definition creating unit 43 completes (creates) the process flow definition by referring to the connection information database 46, and the process flow definition creating unit 43 registers the completed (created) process flow definition in the workflow list database 38. Here, data that is the same as the data stored in the workflow list data base 38 may be stored in the workflow processing server 100 and/or in the MFP 201.

FIG. 7A is a diagram showing an example of the device list table 45. The device list table 45 registers information of processes, information of devices that can execute the processes, and machine identifications (IDs) that identifies the corresponding devices. Here, in the device list table 45, the information of the processes corresponds to the information of the devices and the machine IDs. A machine ID is identifying information that uniquely identifies a physical device in the information processing system 500. The device list table 45 is transmitted to the administrator's PC 150 together with the screen data. With the device list table 45, the administrator's PC 150 can avoid mismatch between the process and the physical device.

FIG. 7B is a diagram showing an example of the connection information database 46. The connection information database 46 registers IP addresses of connection destination physical devices and authentication information. With these IP addresses, when a single workflow is to be executed by a plurality of physical devices, for example, the MFP 201 can transmit a process flow definition and job data to the workflow processing server 100. In the above-described example, the connection information database 46 registers the IP addresses. However, the connection information database 46 according to the embodiment is not limited to this. For example, the connection information database 46 may register machine IDs, instead of the IP addresses. In this case, the connection information database 46 may query a Domain Name System (DNS) server for an IP address, based on the machine ID. In this manner, the connection information database 46 may identify the IP address based on the machine ID. The authentication information is information that is used by a physical device (e.g., the MFP 201 or the workflow processing server 100) to authenticate a user. For example, authentication information used by the MFP 201 may be a user name and a password. Authentication information used by the workflow processing server 100 may be an administrator name and a password. For executing a workflow, the workflow execution/request device 200 queries a user for valid authentication information.

FIGS. 8A and 8B are diagrams showing examples of the process flow definition. FIG. 8A shows the examples of the process flow definition from a viewpoint of an administrator or a user. FIG. 8B shows the example of the process flow definition that is created by the administration server 250. In FIG. 8B, the workflows 2 and 3 are omitted. Immediately after a process flow definition is transmitted from the administrator's PC 150 to the administration server 250, the process flow definition is in a state shown in FIG. 8A.

As shown in FIG. 8A, the workflow list database 38 registers process flow definitions of corresponding workflows. Specifically, for each of the workflow names (e.g., the workflow 1, the workflow 2, or the workflow 3), an order of a sequence of processes and the devices corresponding to the processes are registered. Here, a number of processes included in a single workflow may be greater than or equal to five. Alternatively, a number of processes included in a single workflow may be less than five. A single work flow may be defined only to include one process. In FIG. 8A, the job settings (i.e., the information (iii) described above) of the corresponding processes are omitted.

The process flow definition creating unit 43 completes (creates) the process flow definition as shown in FIG. 8B by inserting some connection processes into the process flow definition transmitted from the administrator's PC 150. As described in detail below, when a physical device to execute a process is to be switched, a connection process is inserted into a corresponding portion of a process flow definition. In FIG. 8B, the process 2-1 and the process 3-1 are connection processes.

FIG. 9 is a diagram showing an example of a process flow definition in XML format. The lines from <flows> to </flows> define a single workflow. The lines from <flow> to </flow> define an order of the processes in the workflow.

A single process is described in units of a <plugin id> tag. The <plugin id> tag described a type of the process to be executed. For example, plugin id="SCAN" represents a process of reading an original document, and type="input" represents that a type of data processing is an input process. Similarly, displayName="Scanning" represents a name of a process that can be visually confirmed by a user on the administrator's PC 150 or on the operations panel 125. Similarly, proceed=machineID_001 represents a machine ID of a physical device that corresponds to the process.

Similarly, plugin id="Compression" represents a process of data compression, plugin id="Connect" represents a connection process, plugin id="OCR" represents an OCR process, plugin id="PDFConverter" represents a PDF conversion process, and plugin id="MailSend" represents a mail sending process. Further, type="filter" represents that a type of data processing is a conversion process, type="output" represents that a type of data processing is an output process, and type="send" represents a transmission process for a connection process, which is neither a conversion process nor an output process.

The lines from <parameter> to defines a job setting. The job setting describes settings that may be required for a corresponding process. Some job settings can be defined by an administrator or a user. Some job settings may be determined in advance as corresponding fixed values.

The <current_point> tag represents a process of a workflow that is to be currently executed (e.g., upon receiving the process flow definition, or immediately after update) by a physical device. Hereinafter, "current_point" may be referred to as a "current point." The MFP 201 or the workflow processing server 100 determines a process to execute by referring to the current point. When a process is completed, content of the current point is updated to be a succeeding process to be executed. For example, when a scanning process is completed, the <current_point> tag is updated as shown below.

```
<current_point>
    <plugin id="Compression" />
</current_point>
```

Figure 10:
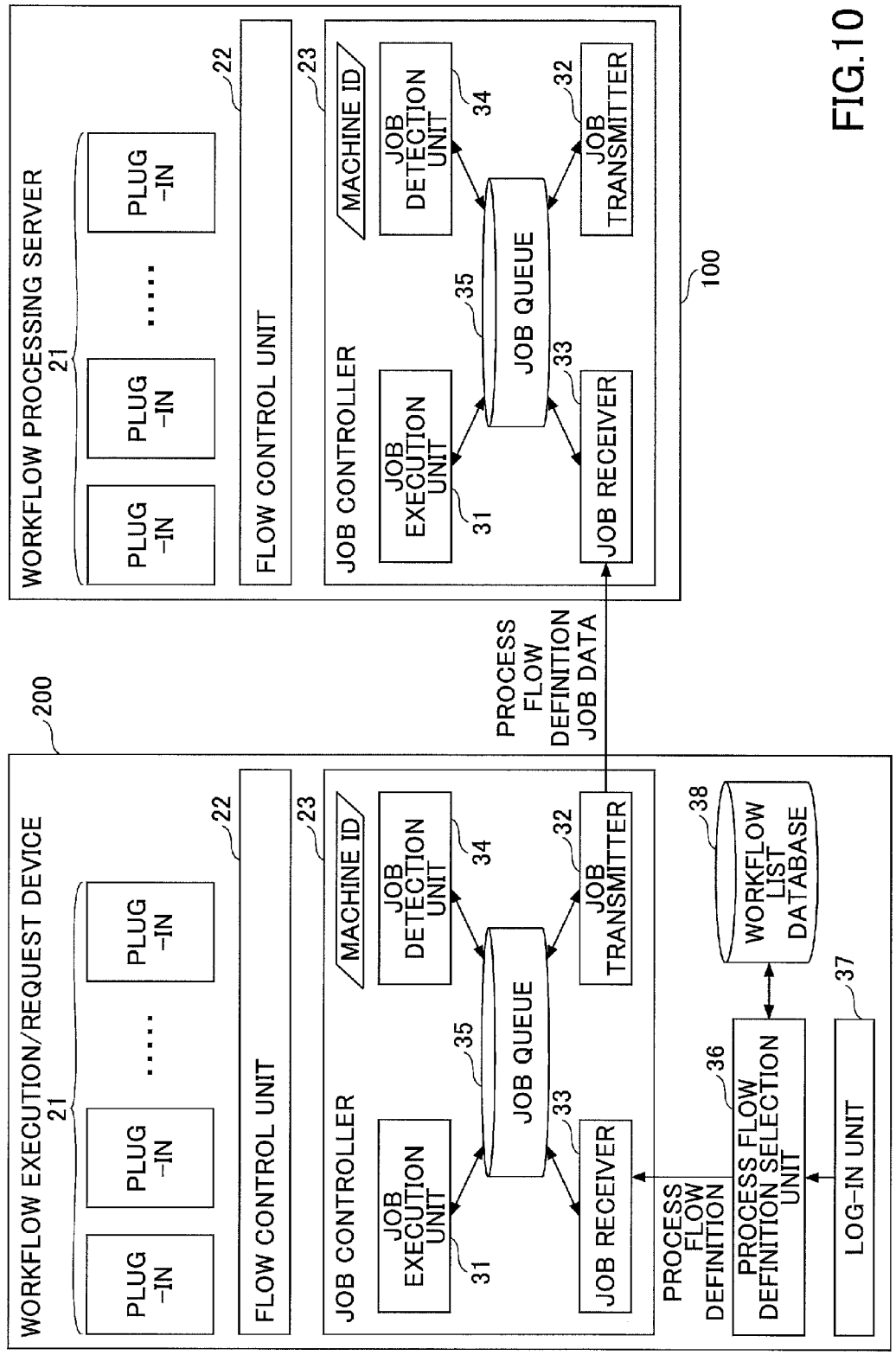
FIG. 10 is a diagram showing an example of functional blocks of the workflow execution/request device (MFP) and the workflow processing server.

FIG. 10 a diagram showing an example of functional blocks of the workflow execution/request device 200 (e.g., the MFP 201) and the workflow processing server 100. The workflow execution/request device 200 may include a log-in unit 37 and a process flow definition selection unit 36. The log-in unit 37 may query authentication information that may be required for executing a workflow. The authentication information may be log-in information for logging in to the MFP 201 operated by a user, for example. In other words, a user that can log in to the MFP 201 is allowed to execute a workflow. In this case, when a physical device is to be switched to another physical device, the other physical device refers to the connection information database 46, and retrieves required authentication information from the connection information database 46. The other physical device attaches the retrieved authentication information to the process flow definition. For a case where authentication information is strictly required, the log-in unit 37 may query a user for authentication information of each of physical devices that executes a corresponding process included in a workflow.

A user can make a selection of a workflow by using the process flow definition selection unit 36. The process flow definition selection unit 36 receives the selection of the workflow made by the user. When the MFP 201 is used within an office, the MFP 201 may obtain the workflow list database 38 from the administration server 250 in advance. A user may cause the MFP 201 to display a list of workflows on the operations panel 125 by a predetermined operation. Then, the user may select a desired workflow. When the workflow execution/request device 200 is the mobile terminal 202, for example, the mobile terminal 202 (as the workflow execution/request device 200) may access the administration server 250 or the workflow processing server 100, and the mobile terminal 202 may retrieve a list of workflows registered in the workflow list database 38.

The process flow definition selection unit 36 queries, for each process included in the workflow selected by the user, a required job setting. For example, for an input process, a setting of a resolution and/or concentration (density) that can be set for scanning may be queried. For a conversion process, for example, a compression ratio may be queried. For an output process (printing), a setting of an e-mail address may be received, for example. When an input is based on electronic data, a setting of job data (e.g., document data, image data, and/or video data) to be processed may be received. When an output is based on printing on a physical medium, such as a sheet of paper, a setting of a size of a sheet, magnification/reduction, aggregation printing (N in 1 printing), color/monochrome, a number sheets to be printed, a finish, and/or the like may be received. The process flow definition selection unit 36 updates the process flow definition with the job settings of the corresponding process.

As for functions related to execution of a workflow, the MFP 201 (i.e., the workflow execution/request device 200) may include one ore more plug-ins 21; a flow control unit 22; and a job controller 23. The job controller 23 controls execution of each of processes of the workflow. First, a job receiver 33 of the job controller 23 retrieves a process flow definition from the process flow definition selection unit 36. Subsequently, by executing an input process, job data is obtained. The process flow definition is stored in a job queue 35 of the job controller 23 together with the job data.

A process flow definition and job data may be transmitted from another physical device. In other words, the MFP 201 (i.e., the workflow execution/request device 200) may receive a process flow definition and job data from the workflow processing server 100. (Additionally, the workflow processing server 100 may receive a process flow definition and job data from the MFP 201 (i.e., the workflow execution/request device 200).) In such a case, the job controller 23 stores the process flow definition and the job data in the job queue 35. Here, a single job may correspond to a single process to which a single plug-in is attached.

The job receiver 33 determines whether the job data is to be processed by the MFP 201 (i.e., the workflow execution/request device 200), based on the process flow definition of the workflow that is temporarily stored in the job queue 35. Namely, the job receiver 33 determines whether the process of the current point corresponds to the machine ID of the MFP 201 (i.e., the workflow execution/request device 200) itself. Even if the process of the current point corresponds to the machine ID of the MFP 201 (i.e., the workflow execution/request device 200) itself, if Plugin id="Connect" is specified, the process is a connection process. Accordingly, in this case, a job execution unit 31 of the job controller 23 updates the process flow definition, and subsequently the job execution unit 31 causes a job transmitter 32 of the job controller 23 to transmit the process flow definition and the job data. The destination of the transmission is described in the process flow definition.

When the process of the current point corresponds to the machine ID of the MFP 201 (i.e., the workflow execution/request device 200) itself, and when the process of the current point is not a connection process, the job execution unit 31 reads out the process flow definition and the job data from the job queue 35, and the job execution unit 31 executes the process defined by the process flow definition and the job data. The job execution unit 31 outputs the process flow definition and the job data to the flow control unit 22.

The flow control unit 22 selects a plug-in 21 in accordance with the process flow definition. As described above, a plug-in 21 may be a plug-in for executing an input process, a plug-in for executing a PDF conversion process, a plug-in for sending an e-mail, a plug-in for executing an OCR process, a plug-in for executing a translation process, or a plug-in for executing an output process, for example. Each of the plug-ins 21 can operate on a common platform. The MFP 201 (i.e., the workflow execution/request device 200) and the workflow processing server 100 can independently add a single plug-in 21, or can independently remove a single plug-in 21. A plug-in 21 does not interfere with processing of another plug-in 21. In this example, it is explained that a process may be executed by a plug-in 21. However, the embodiment is not limited to this. For example, a process may be executed by an application program.

The flow control unit 22 identifies the process of the current point. Then, the flow control unit 22 calls a plug-in 21 that is to execute the process, and the flow control unit 22 causes the plug-in 21 to execute the process. When the job is successfully completed, the flow control unit 22 updates the process of the current point. The flow control unit 22 stores the process flow definition and the job data in the job queue 35.

A job detection unit 34 of the job controller 23 detects that the job is input to the job queue 35. Namely, when job data that is created by the plug-in by executing a single process is stored in the job queue 35, the job detection unit 34 detects that the job data is stored in the job queue 35. After that, the job execution unit 31 and the like repeat similar processes.

The workflow processing server 100 may include one ore more plug-ins 21; a flow control unit 22; and a job controller 23. As for execution of a job, the workflow processing server 100 may include the same functions as those of the MFP 201 (i.e., the workflow execution/request device 200). In other words, an execution procedure of a workflow by the workflow processing server 100 may be the same as that of the MFP 201 (i.e., the workflow execution/request device 200).

Accordingly, even if a process is to be processed across the MFP 201 and the workflow processing server 100, a corresponding workflow can be processed because a process flow definition and job data are communicated through a connection process. Namely, a workflow can be flexibly defined.

[Operation Procedure of Creating a Process Flow Definition]

FIG. 11 shows a flowchart of an example of a procedure for the administrator's PC 150 and the administration server 250 to create a process flow definition.

When the screen data request unit 51 of the administrator's PC 150 queries the administration server 250 for screen data of the correspondence screen, the screen data transmitter 41 of the administration server 250 transmits the screen data to the administrator's PC 150 (S210).

The screen data request unit 51 receives the screen data (S110).

The display controller 53 parses the screen data, and the display controller 53 displays the correspondence screen on the display 320 (S120).

A user sets one or more processes in the logical flow field by operating the keyboard and mouse 306 (S130).

Next, the user defines correspondence between the processes in the logical flow field and physical devices by operating the keyboard and mouse 306 (S140). Details of the procedure are explained by referring to FIGS. 12 to 17.

The process flow definition transmitter 54 transmits the process flow definition to the administration server 250 (S150).

The process flow definition receiver 42 of the administration server 250 receives the process flow definition (S220).

The process flow definition creating unit 43 determines whether the process flow definition includes a process for which a physical device is to be switched to another physical device that is to execute the process (S230). Namely, a determination is made as to whether the process flow definition includes a process for which the MFP 201 is to be switched to the workflow processing server 100, or for which the workflow processing server 100 is to be switched to the MFP 201.

When the process flow definition does not include a process for which a physical device is to be switched to another physical device that is to execute the process (S230:

No), the process flow definition creating unit 43 registers the process flow definition in the workflow list database 38 without updating the process flow definition (S250).

When the process flow definition includes a process for which a physical device is to be switched to another physical device that is to execute the process (S230: Yes), the process flow definition creating unit 43 inserts a connection process immediately prior to the process for which the physical device is to be switched to the other physical device (S240). Then, the process flow definition creating unit 43 registers the updated process flow definition in the workflow list database (S250). Here, as shown in FIG. 9, "plugin id" of the connection process is defined to be "Connect" in advance, and "type" of the connection process is defined to be "send" in advance. The connection process is not to be displayed. Accordingly, for the connection process, "displayName" is not defined (i.e., the corresponding field is blank). The field "proceed" defines the physical device for executing the connection process, which is the device that is to execute the process immediately prior to the connection process. The process flow definition creating unit 43 reads out an IP address corresponding to the physical device (i.e., a connection destination) that is to execute the process subsequent to the connection process from the connection information database 46, and the process flow definition creating unit 43 writes the IP address in the job setting (i.e., in the field of <parameter>) of the connection process. In this manner, by using the connection information database 46, a connection process can be easily inserted.

In the above example, a case is explained where the administration server 250 and the administrator's PC 150 communicate and define the process flow definition. However, the embodiment is not limited to this. For example, the administrator's PC 150 may be a standalone PC, and a process flow definition may be created by the administrator's PC 150 itself. In such a case, the administrator's PC 150 may include the screen data transmitter 41; the process flow definition receiver 42; the process flow definition creating unit 43; the screen data base 44; the device list table 45; the connection information database 46; and the workflow list database 38, in addition to the screen data request unit 51; the operation reception unit 52; the display controller 53; and the process flow definition transmitter 54. Additionally, the network communication unit 308 of the administrator's PC 150 may provide a process flow definition to a system that sequentially executes processes defined by the process flow definition through the network 400.

[Example of a Process Flow Definition]

Figure 12A:
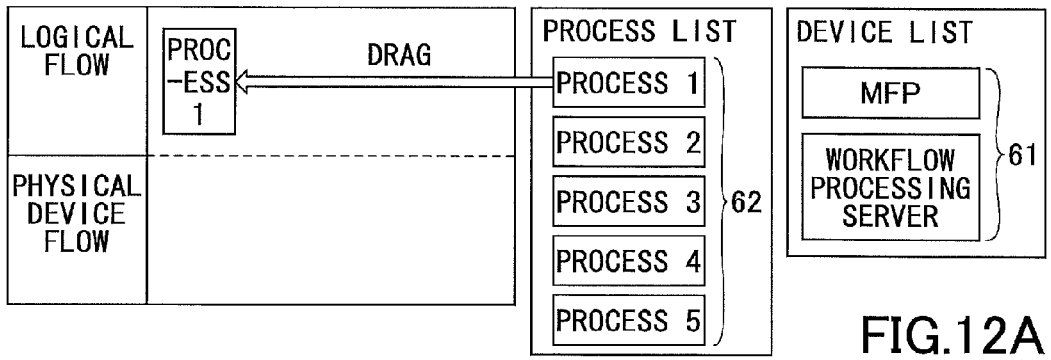
FIGS. 12A-12D are diagrams illustrating an example of the workflow.

FIGS. 12A-12D are diagrams illustrating an example of a process flow definition. FIG. 12A shows an example of an initial condition of the correspondence screen. An administrator sets processes in a logical flow field that is the upper side of the correspondence screen. The administrator defines devices that execute corresponding processes in a physical device flow field that is the lower side of the correspondence screen. In the correspondence screen, a process list and a device list are displayed. The device icons 61 of the device list are based on information of the physical devices stored in the device list table 45. The process icons 62 of the process list are based on information of the processes stored in the device list table 45. The processes 1 to 5 of the process list can actually be displayed in such a manner that the process names, such as an OCR process or a PDF conversion process, can be recognized.

In the initial condition, in the upper side of the correspondence table (i.e., the logical flow field), "process 1" is displayed while being blinked, for example. This is for explicitly indicating a position where the administrator is to drag and drop a process icon 62 of the process list. Alternatively, the administrator may arrange the process icons 62 in a desired order, or only a box for setting the process icons 62 maybe displayed, without supporting an input operation. In a server-client environment, an operation, such as dragging of an icon, may be enabled for a rich client environment. For example, such an operation can be achieved by combining a Canvas tag of HTML 5 and JavaScript. As shown in FIG. 12A, when the administrator selects a process, and drags the selected process to the position of "process 1" in the logical flow field, the first process is defined.

After the process 1 is defined by the administrator, a device icon 61 can be selected in the device list. The display controller 53 can control the correspondence screen, so that only the device icons 61 of the physical devices that can execute the process 1 can be selected in the device list. Additionally, when there is only one physical device that can execute the process 1, the display controller 53 can cause the device icon 61 of the device that can execute the process 1 to be automatically displayed in the physical device flow field, even if the administrator does not operate the correspondence screen. Hereinafter, such automatic arrangement of a device icon 61 is referred to as "automatic arrangement." When the automatic arrangement is executed, the process icon 62 and the device icon 61 can be automatically connected with a line.

Figure 12B:
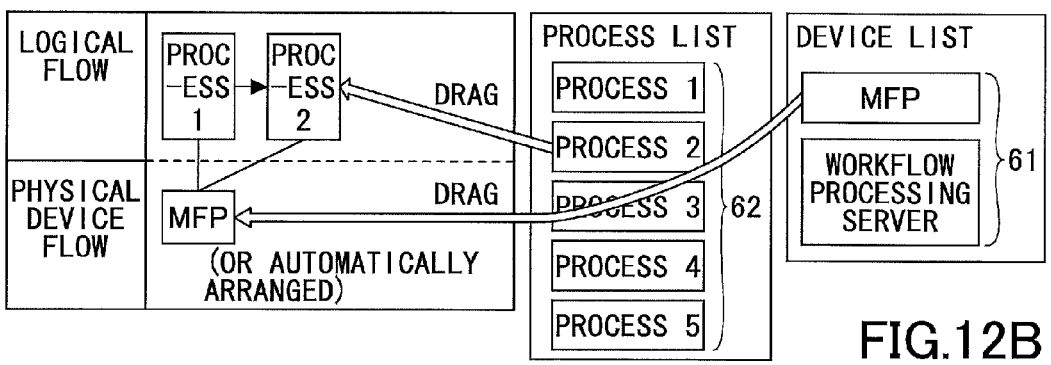

As shown in FIG. 12B, when the administrator selects a process and drags the selected process into the logical flow field, the second process is defined. The display controller 53 displays an arrow at a position downstream the process 1, and the display controller 53 displays the process icon 62 of the process 2 at a predetermined position. The administrator defines a logical flow by repeating such an operation. After defining the process 2, the administrator drags the device icon 61 of the MFP 201 into the physical device flow field.

The administrator may arrange a device icon 61 prior to arranging a process icon 62. When a device icon 61 is arranged in the physical device flow field, and when the administrator arranges a process icon 62 in the logical flow field, it is possible that the process represented by the process icon 62 cannot be executed by the physical device represented by the device icon 61. In such a case, the display controller 53 replaces the device icon 61 in the physical device flow field with another device icon 61 of the physical device that can execute the process represented by the process icon 62.

Figure 12C:
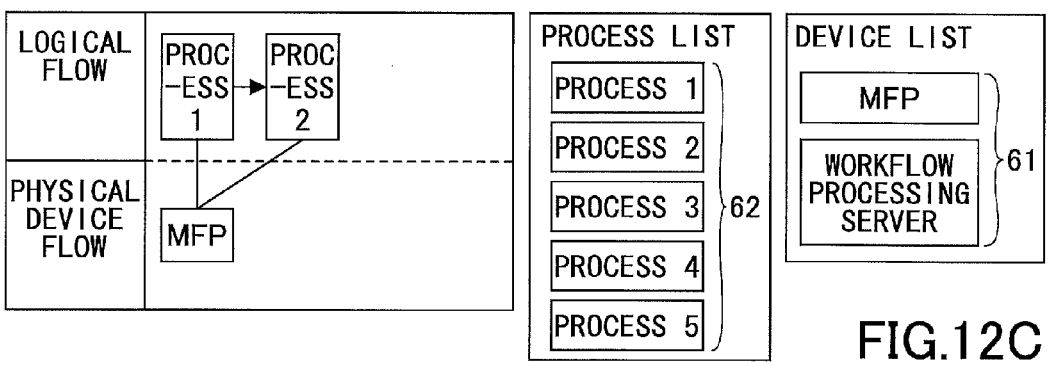
Figure 12D:
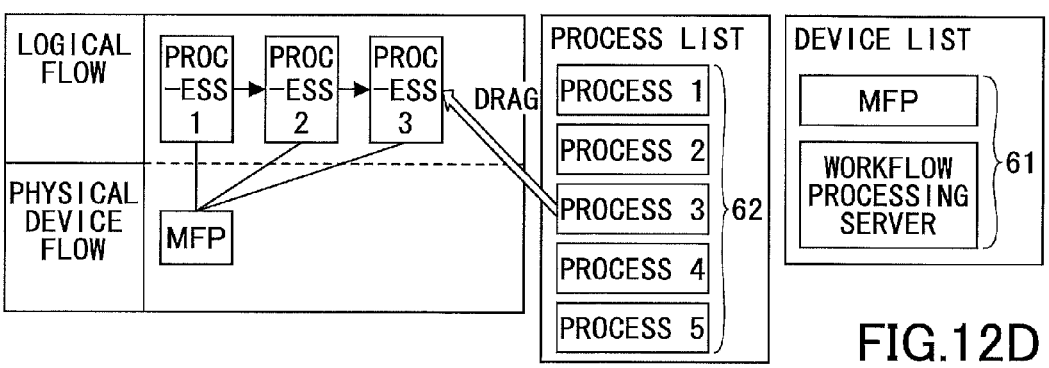

As shown in FIG. 12C, when the administrator arranges the device icon 61 in the physical device flow field, the process icons 62 and the device icon 61 are connected with the corresponding lines. In this manner, the device icon 61 of the MFP 201 and the process icons 62 of the processes 1 and 2 are connected with the corresponding lines. FIG. 12D shows the correspondence screen to which the administrator adds the process 3. When the administrator adds the process icon 62 representing the process 3 to the logical flow field, the display controller 53 automatically applies the correspondence between the physical device and the preceding process to the added process 3. In other words, the display controller 53 defines correspondence between the process 3 and the MFP 201 because the process 2 corresponds to the MFP 201. In this manner, the administrator can define the correspondence between the process 3 and the physical device with fewer steps.

Consequently, an administrator can define correspondence between a single physical device and a plurality of processes only by dragging process icons 62 into the logical flow field.

FIGS. 13A-13C are diagrams illustrating an example of modifying the correspondence. As shown in FIG. 13A, the processes 1 to 5 correspond to the MFP 201. When the administrator wishes to define correspondence between some of the preprocess 1 to 5 and another physical device, the administrator drags a device icon 61 of the other device into the physical device flow field, as shown in FIG. 13A.

FIG. 13B shows the correspondence screen in which the device icon 62 of the workflow processing server 100 is added to the physical device flow field. At this moment, the display controller 53 does not modify anything because the process for which the correspondence is to be modified is not identified. Furthermore, for example, when correspondence between the process 3 and the workflow processing server 100 is to be defined, the administrator's PC 150 may not determine whether only the correspondence between the process 3 and the physical device is to be modified or the correspondence between the processes 3 to 5 and the physical device is to be modified.

Accordingly, the display controller 53 displays a dialog box for receiving a selection of a method of modifying the correspondence. This dialog box can be displayed at the timing of adding the device icon 61 as shown in FIG. 13B. Additionally, this dialog box can be displayed by the administrator at desired timing.

FIG. 13C is a diagram showing an example of the dialog box. For the description "correspondence of the subsequent logical flow" in the dialog box, one method of modification can be selected amongst three alternative methods of modification, which are "to be linked with modification of the correspondence," "not to be linked with modification of the correspondence," and "query as to whether or not to modify the correspondence." The administrator may click a radio button by considering necessity to modify the physical device for the subsequent processes 4 and 5.

"to be linked with modification of the correspondence"

Figure 14A:
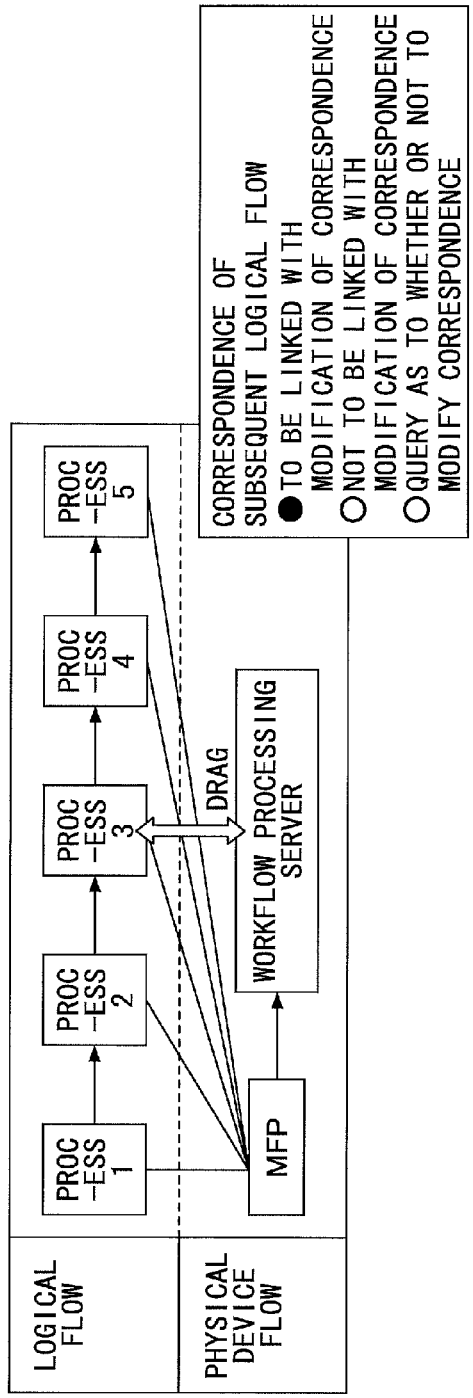
FIGS. 14A and 14B are diagrams showing an example of a correspondence screen for a case where an administrator selects "to be linked with modification of the correspondence;"

FIG. 14A is a diagram showing an example of the correspondence screen for a case in which the administrator selects "to be linked with modification of the correspondence." The administrator defines correspondence between the process 3 and the workflow processing server 100. The correspondence may be defined by dragging from the process icon 62 of the process 3 in the logical flow field to the device icon 61 of the workflow processing server 100. Alternatively, the correspondence may be defined by connecting the process icon 62 of the process 3 and the device icon 61 of the workflow processing server 100 by a dashed line in the correspondence screen.

Figure 14B:
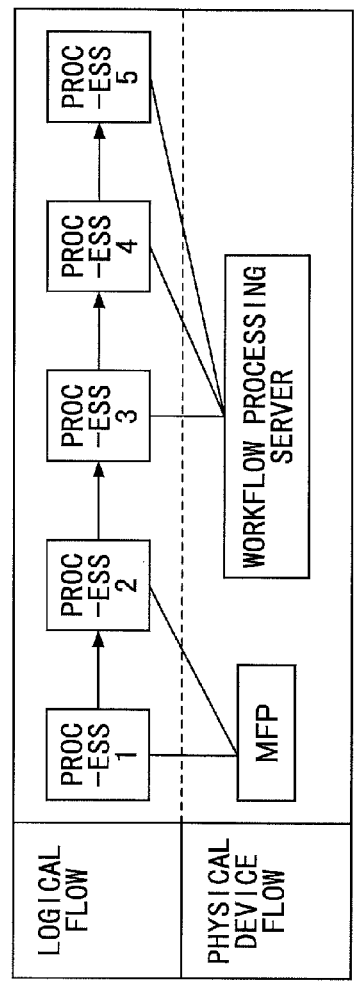

FIG. 14B is a diagram showing an example of the correspondence screen after the correspondence is modified. In accordance with the modification of the correspondence of the process 3, the correspondence between the physical device and the processes 4 and 5 is modified from the correspondence between the MFP 201 and the processes 4 and 5 to the correspondence between the workflow processing server 100 and the processes 4 and 5.

"not to be linked with modification of the correspondence"

Figure 15A:
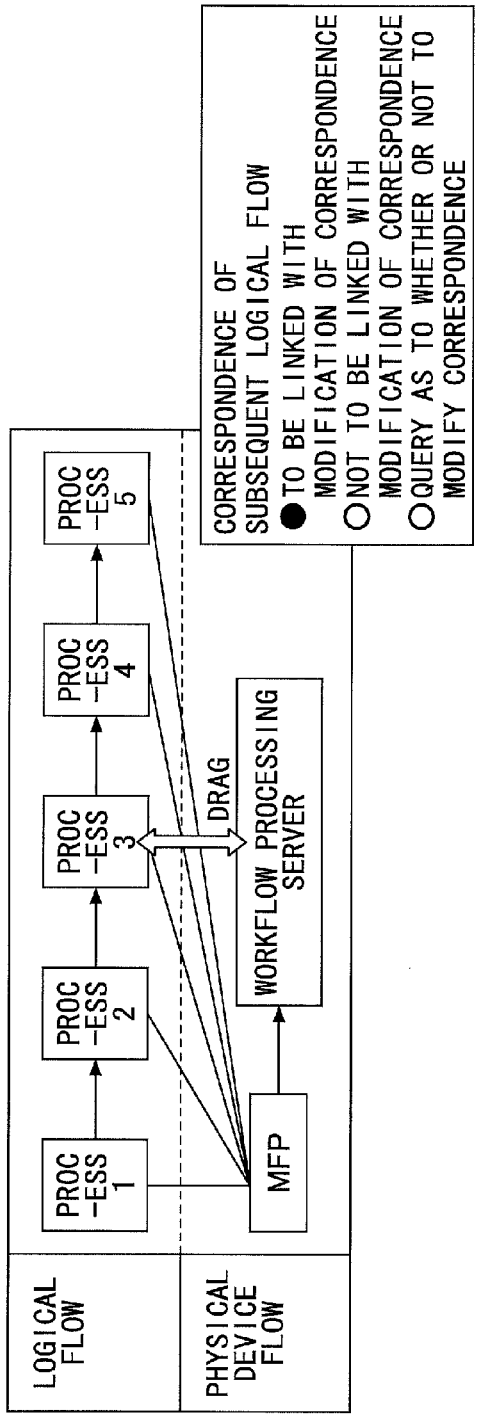
FIGS. 15A and 15B are diagrams showing an example of the correspondence screen for a case where the administrator selects "not to be linked with modification of the correspondence;"
Figure 15B:
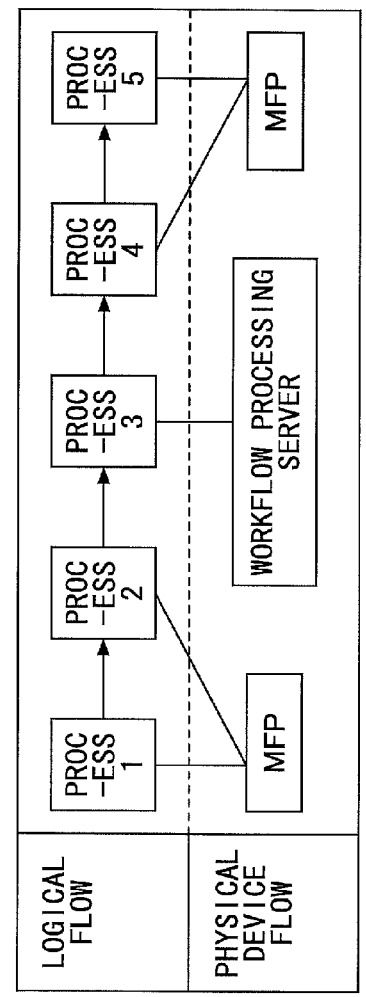

FIG. 15A is a diagram showing an example of the correspondence screen for a case in which the administrator selects "not to be linked with modification of the correspondence." FIG. 15B is a diagram showing an example of the correspondence screen after the correspondence is modified.

After the correspondence of the process 3 is modified, the processes 4 and 5 still correspond to the MFP 201 because "not to be linked with modification of the correspondence" is selected. In this case, the display controller 53 displays the device icon 61 of the MFP 201 at a position downstream the device icon 61 of the workflow processing server 100. The display controller 53 connects the device icon 61 of the MFP 201 to the process icons 62 of the processes 4 and 5 with corresponding lines.

"query as to whether or not to modify the correspondence"

FIG. 16A is a diagram showing an example of the correspondence screen for a case in which the administrator selects "query as to whether or not to modify the correspondence." FIG. 16B shows an example of a dialog box for query. When "query as to whether or not to modify the correspondence" is selected, and when a device icon 61 is added to the physical device flow field and the correspondence between the process 3 and the device icon 61 of the workflow processing server 100 is defined, the display controller 53 display this dialog box.

The dialog box displays "please check a radio button of a process that is to correspond to the physical device "workflow processing server," and press the OK button." Additionally, a "select all" button and a "release all" button are displayed. The processes 4 and 5 that are subsequent to the process 3 are displayed with corresponding check boxes. The administrator can select a method of defining the correspondence of the workflow processing server 100 (i.e., a method of modifying the correspondence), for example, by selecting the "select all" button, or by clicking the corresponding check box.

color coding display after defining the correspondence

Figure 17A:
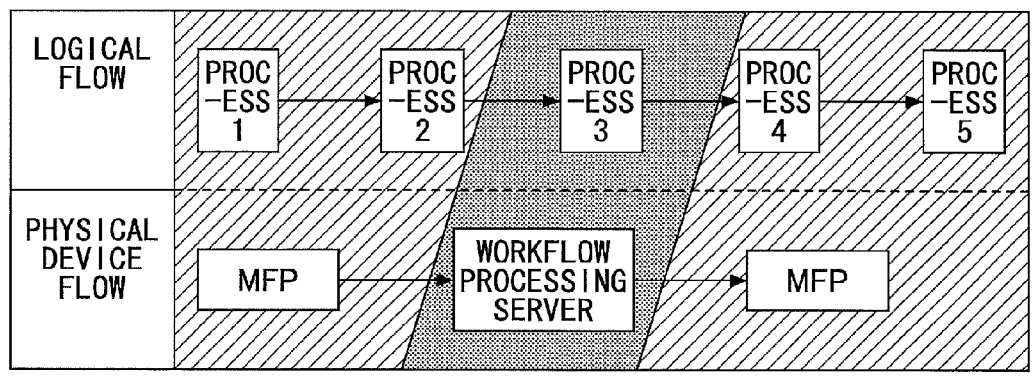
FIGS. 17A and 17B are diagrams showing display examples for a case where the administrator defines correspondence between processes 1 to 5 and physical devices.

FIG. 17A is a diagram showing a display example of the correspondence screen after the administrator defines the correspondence between the processes 1 to 5 and the physical devices. In FIG. 17A, the area where the process icons 62 of the processes 1 and 2 and the device icon 61 of the MFP 201 are arranged is filled with a single color. The area where the process icon 62 of the process 3 and the device icon 61 of the workflow processing server 100 are arranged is filled with a single color that is different from the color of the area of the processes 1 and 2. The area where the process icons 62 of the processes 4 and 5 and the device icon 61 of the MFP 201 are arranged is filled with the same color as the color of the area of the processes 1 and 2. Namely, when correspondence is defined between a process and a physical device, an area where a process icon 62 of the process and a device icon 61 of the physical device are arranged is filled with the same single color. Namely, an administrator can easily visualize correspondence between a process and a physical device by the color coding.

Figure 17B:
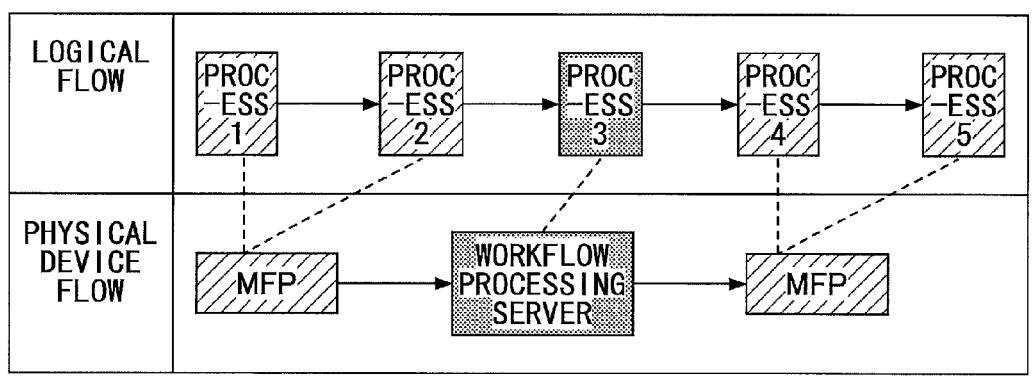

FIG. 17B is a diagram showing another display example of the correspondence between the processes 1 to 5 and the physical devices. In FIG. 17A, the areas other than the areas of the icons are filled with the corresponding colors. In FIG. 17B, the icons are filled with corresponding colors. In other words, the process icons 62 of the processes 1 and 2 are filled with a single color that is the same color as the color of the device icon 61 of the MFP 201. The process icon 62 of the process 3 and the device icon 61 of the workflow preprocess server 100 are filled with a single color that is different from the color of the process icons 62 of the processes 1 and 2. The process icons 62 of the processes 4 and 5 and the device icon 61 of the MFP 201 are filled with the same color as the color of the process icons 62 of the processes 1 and 2. With such color coding, correspondence between a process and a physical device can be easily visualized.

In the above example, the correspondence is represented by the color coding. However, the embodiment is not limited to this. For example, correspondence may be represented by a halftone pattern that is applied to an area and/or an icon (e.g., presence or absence of a halftone pattern is switched depending on correspondence). Alternatively or additionally, correspondence may be represented by a shape of an icon.

[Procedure of Executing a Workflow]

Figure 18:
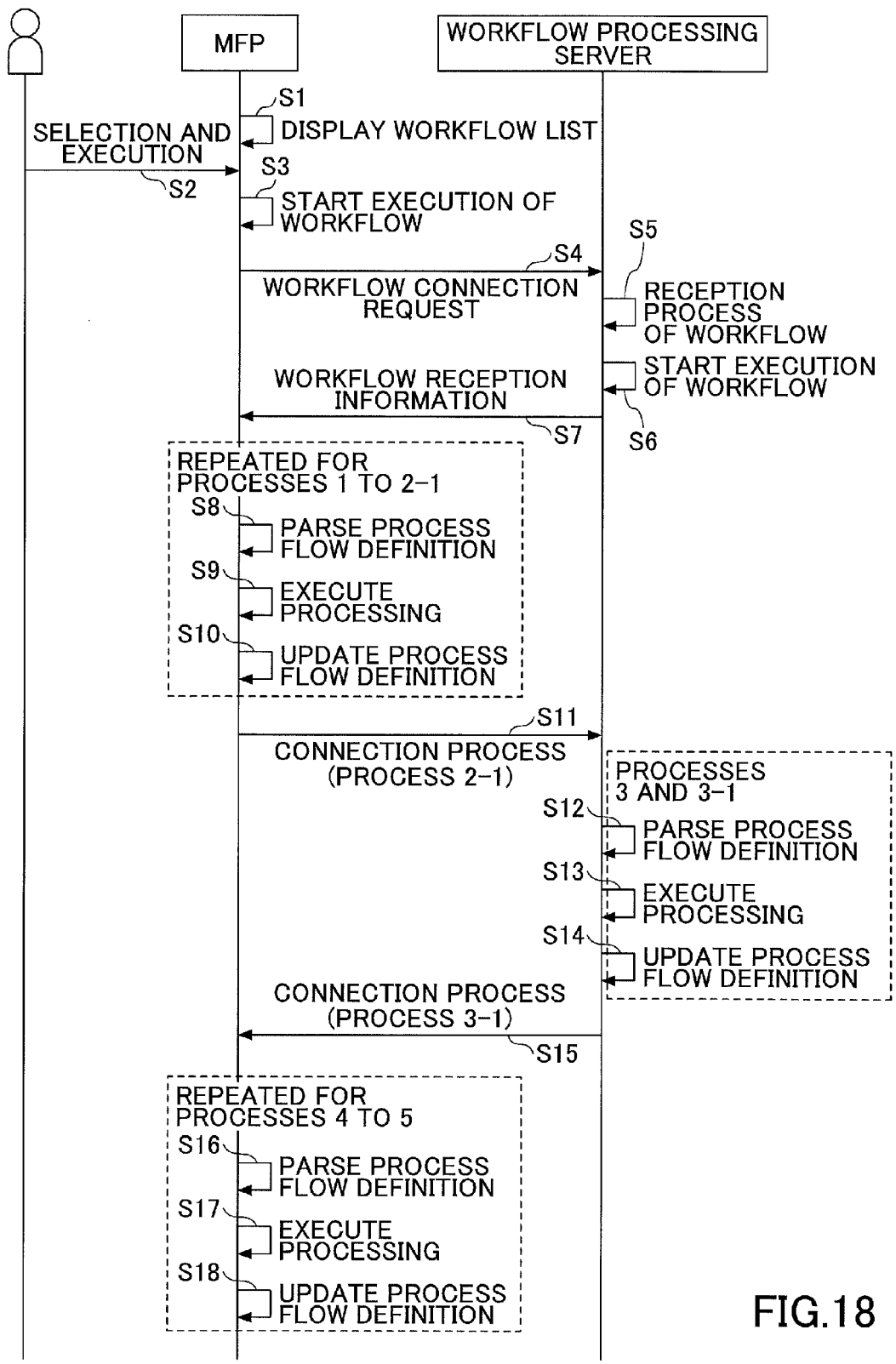
FIG. 18 is a sequence diagram showing an example of a procedure of the information processing system for executing the workflow.

FIG. 18 is a sequence diagram showing an example of a procedure of the information processing system 500 to execute a workflow. FIGS. 19A and 19B are examples of a screen for selecting a workflow.

S1: When a user operates the MFP 201, the MFP 201 displays a list of workflows. FIG. 19A shows an example of a workflow selection screen on which the list of workflows is displayed. The user selects a desired workflow from the workflows 1 to 3, and presses the OK button. By pressing the OK button, execution of the workflow is started. Here, depending on necessity, a user may press a detail button to display processes included in the workflow and an order of the processes.

When the execution of the workflow is started, the MFP 201 requests the user to input a user name and a password, as shown in FIG. 19B. Here, the user name and the password are authentication information for executing the workflow. A user name and a password that are used for logging in the MFP 201 may be used as the authentication information. A user name and a password may preferably be included in a process flow definition. When a user name and a password are included in a process flow definition, authentication can be performed for physical devices. Consequently, security of the workflow can be enhanced.

S2: The user selects a workflow, and inputs a command for starting execution of the workflow to the MFP 201.

S3: The MFP 201 starts execution of the workflow. For example, the MFP 201 identifies a process and/or a machine ID described in the process flow definition.

S4: The MFP 201 transmits a workflow connection request to the identified workflow processing server 100. This communication is for confirming whether a physical device that is to execute the workflow is available for executing the workflow.

S5: The workflow processing server 100 executes a reception process for receiving the workflow. The reception process for receiving the workflow is, for example, a process for attaching a unique JobID to the workflow.

S6: The workflow processing server 100 starts processing of the workflow. Here, to start processing of the workflow means that the workflow is executed when a process flow definition is received.

S7: The workflow processing server 100 transmits workflow reception information (e.g., the JobID) to the MFP 201.

S8: When the MFP 201 confirms that the workflow can be executed, the MFP 201 starts executing the processes 1 to 5. The job receiver 33 parses the process flow definition. This parsing process is for confirming that the MFP 201 is to execute processing of the current point.

S9: When the MFP 201 determines, as a result of the parsing process, that the MFP 102 is to execute processing, the flow control unit 22 executes processing that is assigned to the MFP 201 by using the plug-in 21. The process 1 is an input process. Accordingly, job data is prepared, for example, by scanning an original document, or by reading out or receiving e-mail data that is specified as job data.

S10: The flow control unit 22 updates the process flow definition by updating the current point with the subsequent process. The job data and the process flow definition are stored in the job queue 35.

Steps S8 to S10 are repeated for each of the processes. When the process flow definition is updated after the processes 1 and 2 are executed, the current point is updated to be the connection process of the process 2-1. The job receiver 33 parses the process flow definition, and determines that the process is the connection process (S8). Accordingly, the flow control unit 22 requests the job transmitter 32 to transmits the job without executing the process (S9). Then, the flow control unit 22 updates the process flow definition (S10).

S11: As the connection process, the job transmitter 32 transmits the process flow definition and the job data to the workflow processing server 100, while associating the JobID with the process flow definition and the job data. During steps S11 to S15, the MFP 201 may query the workflow processing server for progress of the processing.

S12: The procedure of the workflow processing server 100 is the same as that of the MFP 201. The job receiver 33 stores the process flow definition and the job data in the job queue 35, and parses the process flow definition.

S13: When the job receiver 33 determines, as a result of the parsing process, that the process is to be executed by the workflow processing server 100, the flow control unit 22 executes the process that is assigned to the workflow processing server 100 by using the plug-in 21.

S14: The flow control unit 22 updates the process flow definition by updating the current point with the subsequent process.

When the process flow definition is updated, the current point is updated to be the connection process of the process 3-1 (S12). Accordingly, the flow control unit 22 requests the job transmitter 32 to transmit the job without executing the process (S13). The flow control unit 22 updates the process flow definition (S14).

S15: As the connection process, the job transmitter 32 transmits the process flow definition and the job data to the MFP 201.

S16: The job receiver 33 stores the process flow definition and the job data in the job queue 35, and the job receiver 33 parses the process flow definition.

S17: When the job receiver 33 determines, as a result of the parsing process, that the process is to be executed by the MFP 201, the flow control unit 22 executes the process that is assigned to the MFP 201 by using the plug-in 21.

S18: The flow control unit 22 updates the process flow definition by updating the current point with the subsequent process. Steps S16 to S18 are repeated for the processes 4 and 5.

As described above, the information processing system 500 according to this embodiment displays the logical flow field and the physical device flow field in a single screen. Accordingly, an administrator can easily define a process flow definition. Additionally, correspondence between an upstream process and a physical device can be applied to an inserted process. Thus, operational steps for an administrator can be reduced. By setting a plurality of methods of modifying correspondence in advance, a desired method of modifying the correspondence can be selected. For example, only correspondence between a part of processes and a physical device can be modified. Alternatively, correspondence between all downstream processes and a physical device can be modified.

In the above-described example, a location of a physical device that executes a workflow is not particularly limited. A workflow may include a process that is to be executed by a cloud computer (which is referred to as "cloud," hereinafter) on the Internet.

Figure 20:
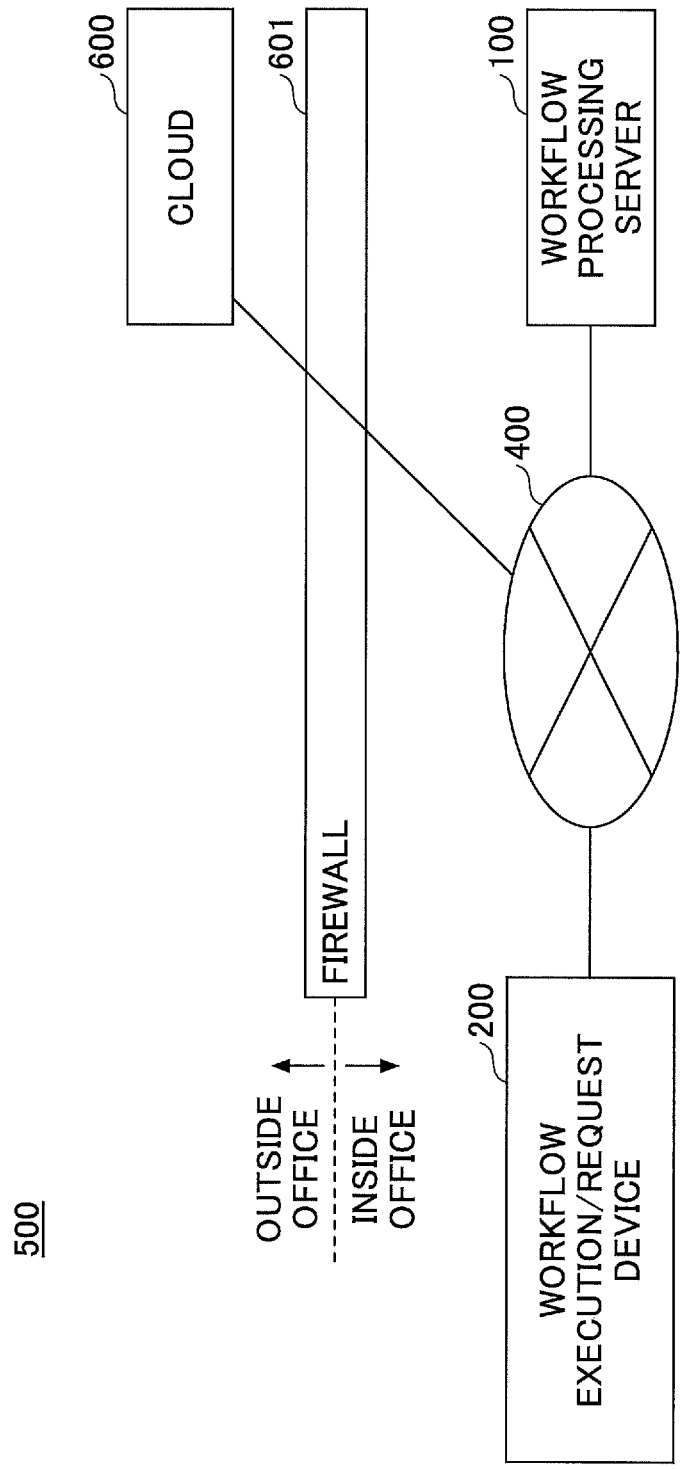
FIG. 20 is a diagram showing another example of the schematic configuration of the information processing system.

FIG. 20 is a diagram showing a schematic configuration of the information processing system 500 according to another example. The workflow execution/request device 200 and the workflow processing server 100 are located within an office. The cloud 600 is located outside the office. Accordingly, in order for the cloud 600 to communicate with the workflow processing server 100 and/or the workflow execution/request device 200, communication is to be performed across a firewall 601.

However, the firewall 601 may prevent the cloud 600 to access the system inside the office. Accordingly, it may be difficult to return the workflow executed by the cloud 600 to the system inside the office. Hereinafter, an example of the information processing system 500 is explained that may conform to cloud computing.

Figure 21A:
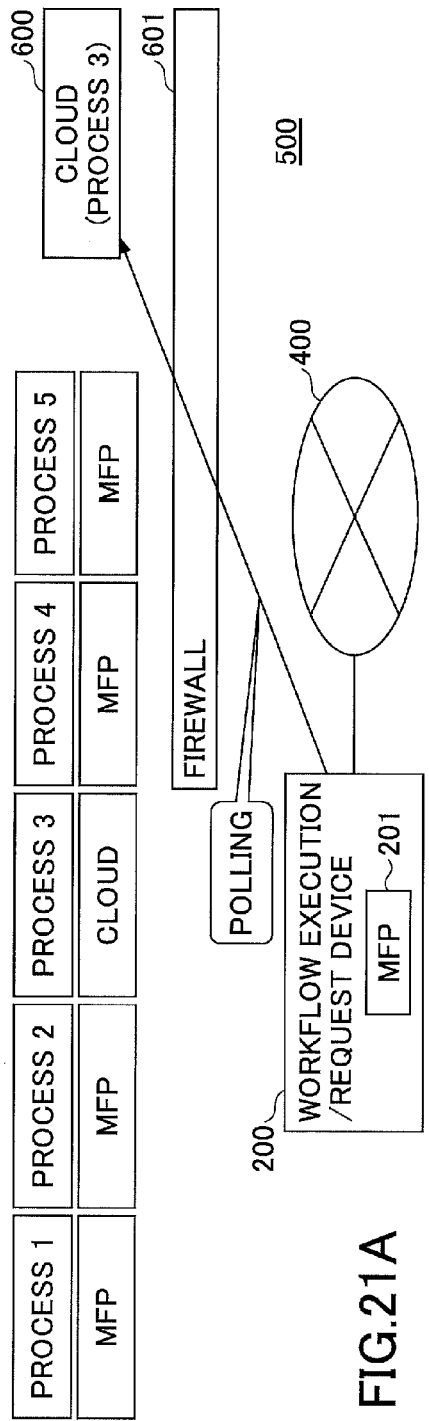
FIGS. 21A and 21B are diagrams schematically illustrating examples of the workflow and the information processing system that executes the workflow.

FIG. 21A is a diagram illustrating an example of an outline of execution of a workflow by the information processing system 500. Suppose that the processes 1 and 2 are to be executed by the MFP 201, the process 3 is to be executed by the cloud 600, and the processes 4 and 5 are to be executed by the MFP 201. In this case, the workflow execution/request device 200 (i.e., MFP 201) that executes the process 2 polls the cloud 600. Here, polling is to query the cloud 600 for completion of the processing. When the cloud 600 responds to the query from the system inside the office, the cloud 600 can transmits the process flow definition and the job data to the system inside the office. In general, for a firewall, a setting can be made such that transmission of a response is allowed that is from a destination IP address of a packet transmitted from the system inside the office by an administrator or the like (i.e., for a case where an IP address of an external transmission source of communication corresponds to an IP address of a destination that is set for communication from the system inside the office). Accordingly, when such a setting is made for the firewall 601, the process flow definition and the job data can be received as a response to a packet that is transmitted from a physical device inside the office.

Figure 21B:
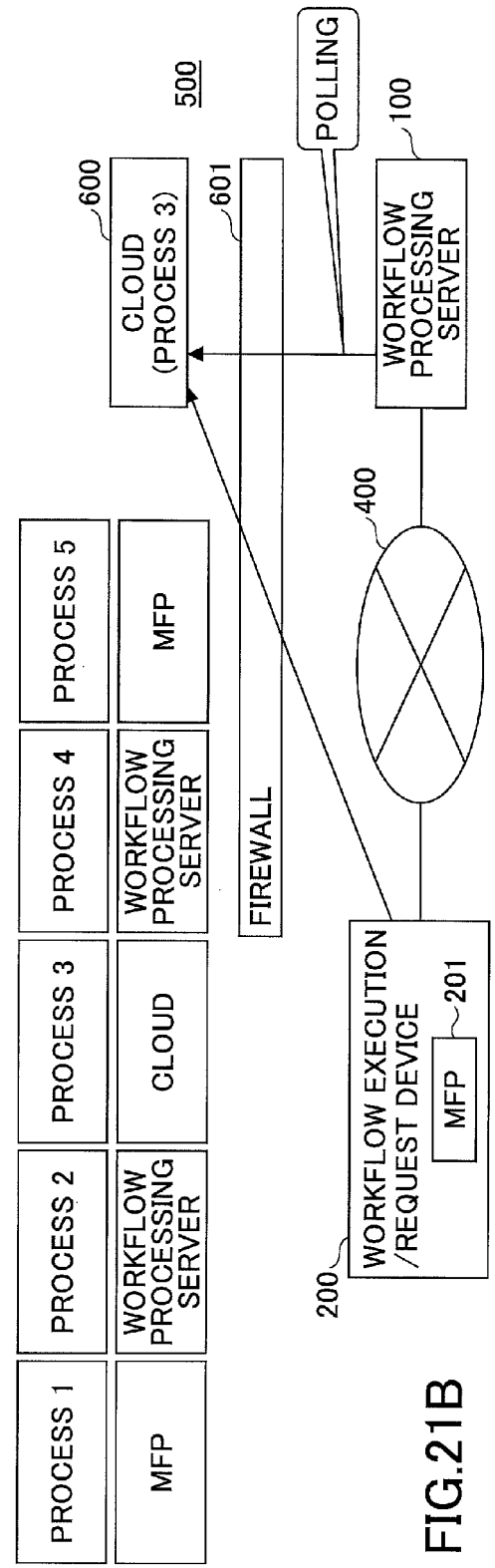

FIG. 21B is a diagram illustrating examples of the workflow including a process to be executed by the workflow processing server 100, and the information processing system 500 that executes the workflow. Suppose that the process 1 is to be executed by the MFP 201, the process 2 is to be executed by the workflow processing server 100, the process 3 is to be executed by the cloud 600, the process 4 is to be executed by the workflow processing server 100, and the process 5 is to be executed by the MFP 201. In this case, the workflow processing server that executes the process 2 polls the cloud 600.

In the above example, the physical device that executes the process immediately prior to the process to be executed by the cloud 600 polls the cloud 600. However, the embodiment is not limited to this. For example, the physical device that is to execute the process immediately after the process to be executed by the cloud 600 may poll the cloud 600. Alternatively, the workflow execution/request device 200 may always poll the cloud 600. In the example described below, it is assumed that the physical device that executes the process immediately prior to the process to be executed by the cloud 600 polls the cloud 600.

[Process Flow Definition Including a Polling Process]

A process flow definition may include a polling process, so that a physical device inside the office can poll the cloud 600. As explained above, an administrator creates a process flow definition such as shown in FIG. 8A. The process flow definition creating unit 43 of the administration server 250 creates a process flow definition including a connection process. In this example, the process flow definition creating unit 43 creates a process flow definition including a polling process.

FIGS. 22A and 22B are diagrams illustrating examples of a process flow definition for polling. The process flow definition creating unit 43 identifies, by referring to the process flow definition into which the connection processes of FIG. 22A are inserted, a physical device (the cloud 600) that is defined as the physical device after the connection process. As shown in FIG. 22A, the process 3 is to be executed by the cloud 600. The device list table 45 registers that the physical device to execute the process is the cloud 600, for example.

As shown in FIG. 22B, the process flow definition creating unit 43 creates another process flow definition for polling such that the process 3 is defined to be a polling process, and the physical device for executing the process 3 is defined to be the MFP 201 that is to execute the process 2-1. It suffices if a polling process can be executed by this process flow definition for polling. The processes 1 to 2-1 are defined to be blank (i.e., the processes 1 to 2-1 are not to be executed). The cloud 600 that executes the process 3 is the only one target of polling. The IP address and the like of the cloud 600 may be registered in the device list table 45.

For a workflow with which a process flow definition and job data are to be received from the cloud 600 more than once, process flow definitions for polling may be created such that the number of the created process flow definitions for polling is equal to the number of times that the process flow definition and the job data are to be received from the could 600.

During execution of the workflow, the physical device updates the process flow definition depending on progress of the processing, and the physical device updates the current point of the process flow definition for polling. When the process of the process flow definition is updated to be the process 3, and when the current point of the process flow definition for polling is updated to be the process 3, only the process flow definition and the job data are transmitted to the cloud 600. In the process flow definition for polling, the physical device that is to execute the process 3 is defined to be the MFP 201. Accordingly, the process flow definition for polling is held by the MFP 201. In this manner, the MFP 201 can poll the cloud 600. In the process flow definition for polling, there is no process after the process 3. Accordingly, after the polling process is completed, the process flow definition for polling is discarded.

A physical device may create the process flow definition for polling during execution of a workflow. When the current point is a connection process, and when a process after the connection process is to be executed by a cloud, the physical device may create the process flow definition for polling. In this case, the physical device that created the process flow definition for polling is to execute the polling process. Accordingly, the physical device executes the polling process.

Figure 23:
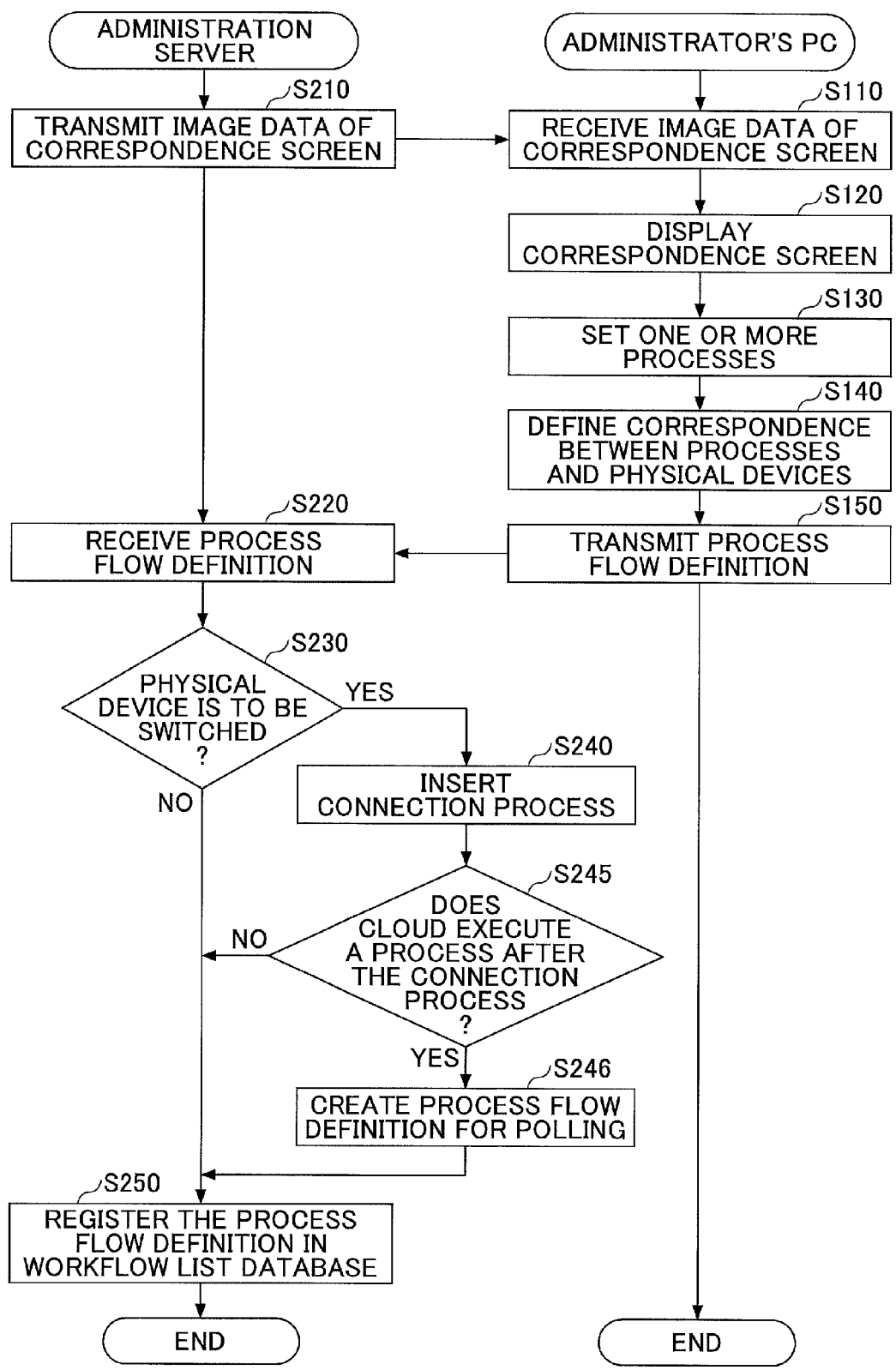
FIG. 23 is a flowchart showing another example of the procedure of the administrator's PC and the administration server for creating the process flow definition.

FIG. 23 is a flowchart showing another example of the procedure of the administrator's PC 150 and the administration server 250 for creating the process flow definition. The flow chart of FIG. 23 is almost the same as that of FIG. 11. However, as shown in the flowchart of FIG. 23, after the process flow definition creating unit 43 inserts a connection process (S240) immediately prior to switching of a physical device, a determination is made as to whether a physical device that is to execute the process after the connection process is a cloud or not (S245).

Figure 24:
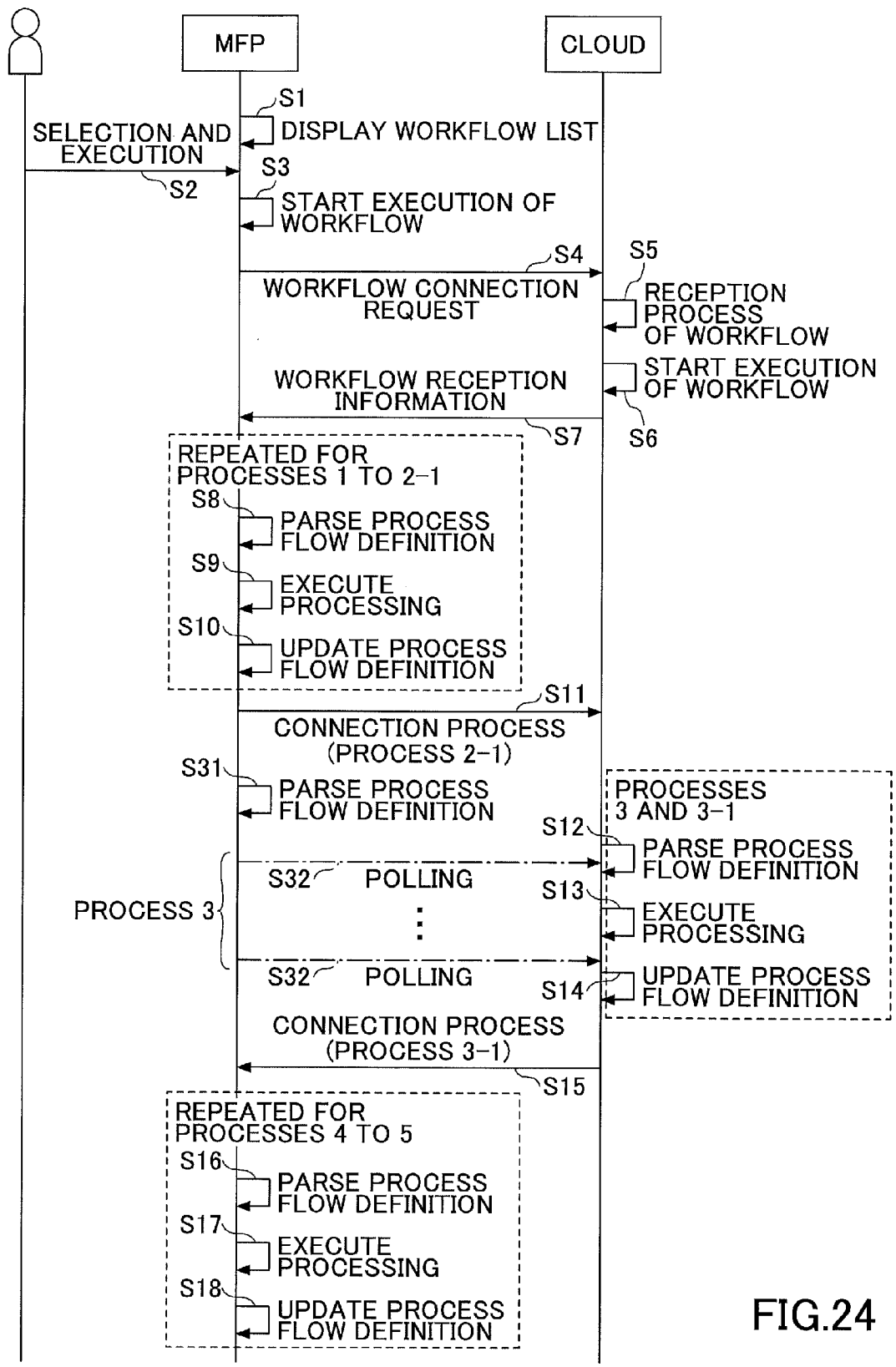
FIG. 24 is a sequence diagram showing another example of the procedure of the information processing system for executing the workflow.
Figure 25:
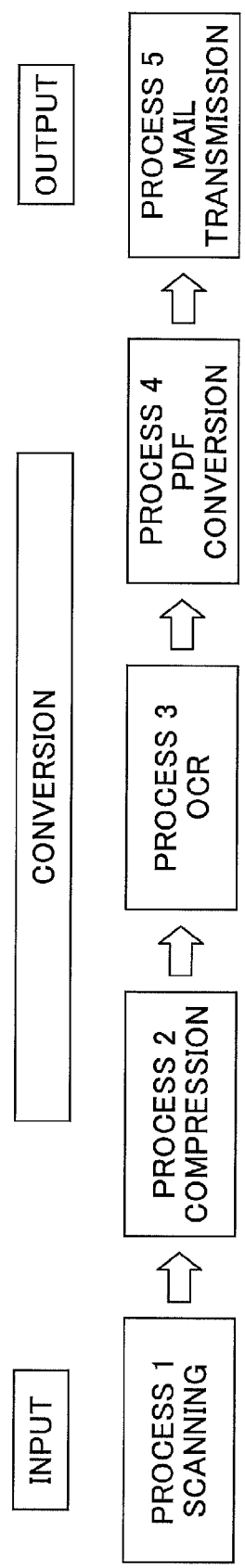
FIG. 25 is a diagram showing an example of processes included in the workflow.

When the physical device that is to execute the process after the connection process is a cloud (S245: Yes), the process flow definition creating unit 43 creates a process flow definition for polling (S246). The process after step S246 is the same as that of FIG. 11. FIG. 24 is a sequence diagram showing another example of the procedure of the information processing system 500 for executing the workflow. The procedure of FIG. 24 is almost the same as that of FIG. 18. The procedure of FIG. 24 is different from that of FIG. 18 in the procedure of executing the process 3.

By steps S8 to S10, the current point of the process flow definition is updated to be the process 3, and the current point of the process flow definition for monitoring is updated to be the process 3.

S11: As the connection process, the job transmitter 32 transmits the process flow definition and the job data to the cloud 600. The procedure of the cloud 600 is the same as that of FIG. 18.

S31: The job receiver 33 parses the process flow definition. Here, the job queue 35 stores at least the process flow definition for polling.

S32: The job receiver 33 determines, as a result of the parsing process, that the MFP 201 is to execute the polling process. Accordingly, the job controller 23 of the MFP 201 (or the flow control unit 22 of the MFP 201) executes the polling process for polling the cloud 600. The job controller 23 attempts to update the process flow definition for polling by updating the current point with the subsequent process. However, the job controller 23 discards the process flow definition for polling because there is not subsequent process.

S15: As the connection process, a job transmitter 32 of the cloud 600 transmits the process flow definition and the job data to the MFP 201 as a response to a query from the MFP 201.

The process after step S15 is the same as that of FIG. 18.

As explained above, the information processing system 500 according to this embodiment displays the logical flow field and the physical device flow field in a single screen. Accordingly, an administrator can easily define a process flow definition. Additionally, with the information processing system 500, a workflow can be easily and flexibly defined such that processing is executed across a firewall.

Hereinabove, a process flow definition creating system, a process flow definition creating device, and a method of creating a process flow definition are explained by the embodiment. However, the present invention is not limited to the specifically disclosed embodiment, and variations and modifications may be made within the scope of the present invention. Specific examples of numerical values are used in order to facilitate understanding of the invention. However, these numerical values are simply illustrative, and any other appropriate values may be used, except as indicated otherwise. The separations of the sections of the specification are not essential to the present invention. Depending on necessity, subject matter described in two or more sections may be combined and used, and subject matter described in a section may be applied to subject matter described in another section (provided that they do not contradict). A boundary of a functional unit or a processing unit in a functional block may not correspond to a boundary of a physical component. An operation by a plurality of functional units may be physically executed by a single component. Alternatively, an operation by a single functional unit may be physically executed by a plurality of components.

The present invention can be implemented in any convenient form, for example using dedicated hardware, or a mixture of dedicated hardware and software. The present invention may be implemented as computer software implemented by one or more network processing apparatuses. The network can comprise any conventional terrestrial or wireless communications network, such as the Internet. The processing apparatuses can compromise any suitable programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device. The hardware platform includes any desired hardware resources including, for example, a central processing unit (CPU), a random access memory (RAM), and a hard disk drive (HDD). The CPU may include processors of any desired kinds and numbers. The RAM may include any desired volatile or nonvolatile memories. The HDD may include any desired nonvolatile memories capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

The present application is based on and claims the benefit of priority of Japanese priority application No. 2013-054326 filed on Mar. 15, 2013, the entire contents of which are hereby incorporated herein by reference.

What is claimed is:

1. A process flow definition creating system configured to provide a process flow definition to a system for executing processes in an order in accordance with the process flow definition for defining the processes to be executed by corresponding devices and the order of executing the processes, the process flow definition creating system comprising:

a memory configured store a list of the devices and screen information, wherein the screen information is for displaying a first field and a second field in parallel, the first field is for setting the processes in the order, and the second field is for setting the devices that are to execute the corresponding processes; and a processor, wherein the processor parses the screen information, and displays the parsed screen information, wherein the processor receives a setting for the first field and a setting for the second field, wherein the setting for the first field defines the processes and the order of the processes, and the setting for the second field defines correspondence between the processes and the devices that are to execute the processes, wherein the processor creates the process flow definition that indicates the processes to be executed by the corresponding devices and the order of executing the processes, based on the order of the processes and the devices corresponding to the processes that are received by the processor, and wherein the memory stores the process flow definition.

2. The process flow definition creating system according to claim 1, wherein the processor displays the processes in the first field while visually associating the processes in the first field with the devices in the second field.

3. The process flow definition creating system according to claim 2 wherein, when the processor receives an addition of a process to the first field in a state in which the processes in the first field are visually associated with the devices in the second field, the processor displays the added process while visually associating the added process with the device that is associated with the last process in the order.

4. The process flow definition creating system according to claim 2, wherein, when the processor receives an addition of a device to the second field and new correspondence between the added device and the process that is associated with the device other than the added device in the state in which the processes in the first field are visually associated with the devices in the second field, the processor displays the process associated with the added device by the new correspondence and the downstream processes that are downstream the process associated with the added device while visually associating the process associated with the added device and the downstream processes with the added device.

5. The process flow definition creating system according to claim 2, wherein, when the processor receives an addition of a device to the second field and new correspondence between the added device and the process that is associated with the device other than the added device in the state in which the processes in the first field are visually associated with the devices in the second field, the processor displays the process that is associated with the added device by the new correspondence while visually associating only the process that is associated with the added device with the added device, and the processor displays the downstream processes that are downstream the process that is associated with the added device while visually associating the downstream processes with the device that is added downstream the added device.

6. The process flow definition creating system according to claim 2, wherein, when the processor receives an addition of a device to the second field and new correspondence between the added device and the process that is associated with the device other than the added device in the state in which the processes in the first field are visually associated with the devices in the second field, the processor displays a setting screen for receiving a setting of visually associating the added device with the downstream processes that are downstream the process that is associated with the added device by the new correspondence, a setting of visually associating only the process that is associated with the added device with the added device, or a setting of visually associating the device that is added downstream the added device with the downstream processes that are downstream the process that is associated with the added device.

7. The process flow definition creating system according to claim 2, wherein the processor displays one of the devices and one or more processes of the processes with a first color, wherein the one or more processes are associated with the one of the devices, and wherein the processor displays another one of the devices and another one or more processes of the processes with a second color, wherein the other one or more processes are associated with the other one of the devices, and the second color is different from the first color.

8. The process flow definition creating system according to claim 1, wherein the memory stores connection information for communicating with the devices, wherein, when one of the devices is to be switched to another one of the devices for executing one of the processes, the processor reads out the connection information for the one of the devices to transmit the process flow definition to the other one of the devices from the memory, and the processor inserts the connection information as a connection process immediately prior to the one of the process for which the one of the devices is to be switched.

9. The process flow definition creating system according to claim 8, wherein, when one of the devices is to be switched to another device for executing one of the processes, and when the other device is outside a firewall, the processor creates the process flow definition including a polling process such that one of the devices inside the firewall periodically queries the other device for completion of the one of the processes.

10. A process flow definition creating device comprising:

a memory configured store a list of devices and screen information, wherein the screen information is for displaying a first field and a second field in parallel, the first field is for setting processes in an order, and the second field is for setting the devices that are to execute the corresponding processes; and a processor, wherein the processor parses the screen information, and displays the parsed screen information, wherein the processor receives a setting for the first field and a setting for the second field, wherein the setting for the first field defines the processes and the order of the processes, and the setting for the second field defines correspondence between the processes and the devices that are to execute the processes, wherein the processor creates a process flow definition that indicates the processes to be executed by the corresponding devices and the order of executing the processes, based on the order of the processes and the devices corresponding to the processes that are received by the processor, wherein the processor store the process flow definition, and wherein the processor transmits the process flow definition to a system for executing the processes in the order in accordance with the process flow definition.

11. The process flow definition creating device according to claim 10, wherein the processor displays the processes in the first field while visually associating the processes in the first field with the devices in the second field.

12. The process flow definition creating device according to claim 11,
wherein, when the processor receives an addition of a process to the first field in a state in which the processes in the first field are visually associated with the devices in the second field, the processor displays the added process while visually associating the added process with the device that is associated with the last process in the order.

13. The process flow definition creating device according to claim 11,
wherein, when the processor receives an addition of a device to the second field and new correspondence between the added device and the process that is associated with the device other than the added device in the state in which the processes in the first field are visually associated with the devices in the second field,
the processor displays the process associated with the added device by the new correspondence and the downstream processes that are downstream the process associated with the added device while visually associating the process associated with the added device and the downstream processes with the added device.

14. The process flow definition creating device according to claim 11,
wherein, when the processor receives an addition of a device to the second field and new correspondence between the added device and the process that is associated with the device other than the added device in the state in which the processes in the first field are visually associated with the devices in the second field,
the processor displays the process that is associated with the added device by the new correspondence while visually associating only the process that is associated with the added device with the added device, and the processor displays the downstream processes that are downstream the process that is associated with the added device while visually associating the downstream processes with the device that is added downstream the added device.

15. The process flow definition creating device according to claim 11,
wherein, when the processor receives an addition of a device to the second field and new correspondence between the added device and the process that is associated with the device other than the added device in the state in which the processes in the first field are visually associated with the devices in the second field,
the processor displays a setting screen for receiving a setting of visually associating the added device with the downstream processes that are downstream the process that is associated with the added device by the new correspondence, a setting of visually associating only the process that is associated with the added device with the added device, or a setting of visually associating the device that is added downstream the added device with the downstream processes that are downstream the process that is associated with the added device.

16. The process flow definition creating device according to claim 11,
wherein the processor displays one of the devices and one or more processes of the processes with a first color, wherein the one or more processes are associated with the one of the devices, and
wherein the processor displays another one of the devices and another one or more processes of the processes with a second color, wherein the other one or more processes are associated with the other one of the devices, and the second color is different from the first color.

17. The process flow definition creating device according to claim 10,
wherein the memory stores connection information for communicating with the devices,
wherein, when one of the devices is to be switched to another one of the devices for executing one of the processes, the processor reads out the connection information for the one of the devices to transmit the process flow definition to the other one of the devices from the connection information storage unit, and the processor inserts the connection information as a connection process immediately prior to the one of the process for which the one of the devices is to be switched.

18. The process flow definition creating device according to claim 17,
wherein, when one of the devices is to be switched to another device for executing one of the processes, and when the other device is outside a firewall, the processor creates the process flow definition including a polling process such that one of the devices inside the firewall periodically queries the other device for completion of the one of the processes.

19. A method of creating a process flow definition, wherein the process flow definition is to be provided to a system for executing processes in an order in accordance with the process flow definition, and the process flow definition defines the processes to be executed by corresponding devices and the order of executing the processes, the method comprising:
storing a list of the devices;
storing screen information, wherein the screen information is for displaying a first field and a second field in parallel, the first field is for setting the processes in the order, and the second field is for setting the devices that are to execute the corresponding processes;
parsing the screen information, and displaying the parsed screen information;
receiving a setting for the first field and a setting for the second field, wherein the setting for the first field defines the processes and the order of the processes, and the setting for the second field defines correspondence between the processes and the devices that are to execute the processes;
creating the process flow definition that indicates the processes to be executed by the corresponding devices and the order of executing the processes, based on the order of the processes and the devices corresponding to the processes that are received by the receiving; and
storing the process flow definition.

* * * * *